United States Patent
Keller

(10) Patent No.: US 10,358,040 B1
(45) Date of Patent: Jul. 23, 2019

(54) DRIVE ASSEMBLY AND SYSTEM FOR UTILITY VEHICLE

(71) Applicant: Hydro-Gear Limited Partnership, Sullivan, IL (US)

(72) Inventor: Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 15/274,030

(22) Filed: Sep. 23, 2016

Related U.S. Application Data

(63) Continuation-in-part of application No. 15/170,137, filed on Jun. 1, 2016.

(60) Provisional application No. 62/239,489, filed on Oct. 9, 2015, provisional application No. 62/190,015, filed on Jul. 8, 2015, provisional application No. 62/183,476, filed on Jun. 23, 2015, provisional application No. 62/169,389, filed on Jun. 1, 2015.

(51) Int. Cl.
| | |
|---|---|
| *B60K 1/00* | (2006.01) |
| *B60L 11/02* | (2006.01) |
| *B60K 1/02* | (2006.01) |
| *B60K 25/00* | (2006.01) |

(52) U.S. Cl.
CPC .............. *B60L 11/02* (2013.01); *B60K 1/02* (2013.01); *B60K 25/00* (2013.01); *B60K 2001/003* (2013.01); *B60Y 2200/223* (2013.01); *B60Y 2306/05* (2013.01)

(58) Field of Classification Search
CPC ...... B60K 1/02; B60K 1/00; B60K 2001/005; B60K 2001/003; B60K 2001/006; B60K 17/02; B60K 17/00; B60K 11/02; B60K 25/00; F01P 3/12; F01P 3/00; F01P 5/10; F01P 5/04; F01P 2005/125; F01P 2005/046; F01P 11/04; B60L 11/02; B60L 11/00
See application file for complete search history.

(56) References Cited

U.S. PATENT DOCUMENTS

| | | | |
|---|---|---|---|
| 4,427,150 | A | 1/1984 | van Basshuysen et al. |
| 4,815,550 | A | 3/1989 | Mather et al. |

(Continued)

FOREIGN PATENT DOCUMENTS

| | | |
|---|---|---|
| WO | WO2012092344 | 5/2012 |
| WO | WO2013026062 | 2/2013 |
| WO | WO2015186414 | 12/2015 |

OTHER PUBLICATIONS

U.S. Appl. No. 15/160,331, filed May 20, 2016.

(Continued)

*Primary Examiner* — James M Dolak
(74) *Attorney, Agent, or Firm* — Neal, Gerber & Eisenberg LLP

(57) ABSTRACT

A compact generator and coolant pump assembly may be used on a vehicle having a fluid reservoir and a plurality of electrical components disposed on the vehicle. The generator includes a rotor and stator disposed in a housing and the rotor is driven by a rotatable input member to generate an electrical output for use by one or more components of the vehicle. The assembly also includes a circulating pump connected to an upper portion of a generator housing and driven by the rotatable input member. A clutch assembly driven by the rotatable input member and engaged to and driving a clutch output may be located adjacent to the lower housing of the generator.

23 Claims, 19 Drawing Sheets

(56) References Cited

U.S. PATENT DOCUMENTS

| | | |
|---|---|---|
| 4,906,166 A | 3/1990 | Seidel |
| 4,949,805 A | 8/1990 | Mather et al. |
| 4,971,525 A | 11/1990 | Nakayoshi et al. |
| 5,127,485 A | 7/1992 | Wakuta et al. |
| 5,372,213 A | 12/1994 | Hasebe et al. |
| 5,474,428 A | 12/1995 | Kimura et al. |
| 5,713,427 A * | 2/1998 | Lutz .................. B60K 1/02 180/65.245 |
| 5,775,583 A * | 7/1998 | Braatz .................. B60H 1/14 237/12.3 B |
| 5,952,746 A | 9/1999 | Mittmann et al. |
| 6,332,393 B1 | 12/2001 | Trimble |
| 6,394,210 B2 | 5/2002 | Matsuda et al. |
| 6,450,275 B1 | 9/2002 | Gabriel et al. |
| 6,527,074 B1 | 3/2003 | Morishita |
| 6,568,494 B2 | 5/2003 | Takahashi |
| 6,591,806 B2 | 7/2003 | Asano et al. |
| 6,651,761 B1 | 11/2003 | Hrovat et al. |
| 6,777,837 B2 | 8/2004 | Tsuzuki et al. |
| 6,811,509 B1 | 11/2004 | Langenfeld et al. |
| 7,017,693 B2 | 3/2006 | Omote et al. |
| 7,083,014 B2 | 8/2006 | Forster |
| 7,131,825 B2 | 11/2006 | Wos |
| 7,156,195 B2 | 1/2007 | Yamagishi et al. |
| 7,160,086 B2 | 1/2007 | Maceyka et al. |
| 7,282,875 B2 | 10/2007 | Lindsey |
| 7,311,184 B2 * | 12/2007 | Patridge ............... B60K 25/00 180/65.21 |
| 7,421,928 B2 | 9/2008 | Klaus et al. |
| 7,485,979 B1 | 2/2009 | Staalesen |
| 7,584,722 B2 * | 9/2009 | Sobotzik ............... F01P 7/048 123/41.11 |
| 7,614,227 B2 | 11/2009 | Carlson et al. |
| 7,669,414 B2 | 3/2010 | Loeffler |
| 7,729,118 B2 | 6/2010 | Lai et al. |
| 7,870,915 B2 | 1/2011 | Beeson et al. |
| 7,971,632 B2 | 7/2011 | Eriksen |
| 8,055,399 B2 | 11/2011 | Wyatt et al. |
| 8,066,492 B2 | 11/2011 | Rogner |
| 8,080,909 B2 | 12/2011 | Perkins |
| 8,143,754 B2 | 3/2012 | Berger et al. |
| 8,191,342 B2 | 6/2012 | Ishii et al. |
| 8,227,948 B1 | 7/2012 | Fox et al. |
| 8,232,697 B2 | 7/2012 | Chiba et al. |
| 8,276,831 B2 * | 10/2012 | Rutherford .......... B60K 17/28 123/2 |
| 8,292,011 B2 * | 10/2012 | Cimatti ................ B60K 6/24 180/65.22 |
| 8,459,389 B2 | 6/2013 | Myers et al. |
| 8,487,489 B2 | 7/2013 | Palafox et al. |
| 8,499,869 B2 | 8/2013 | Cimatti et al. |
| 8,615,976 B1 | 12/2013 | Hauser et al. |
| 8,803,380 B2 * | 8/2014 | Chamberlin .......... H02K 5/20 310/54 |
| 8,807,114 B2 | 8/2014 | Itakura |
| 9,017,215 B2 * | 4/2015 | Schmitz ............... B60K 25/02 477/44 |
| 9,027,727 B2 * | 5/2015 | Danford .............. F16D 27/00 192/90 |
| 9,054,565 B2 * | 6/2015 | Fulton ................. H02K 9/19 |
| 9,080,293 B2 | 7/2015 | Graner et al. |
| 9,114,798 B1 | 8/2015 | Fox et al. |
| 9,115,720 B2 | 8/2015 | Rosinski et al. |
| 9,115,794 B2 | 8/2015 | Vanderzyden et al. |
| 9,168,670 B2 | 10/2015 | Bergquist et al. |
| 9,187,880 B2 | 11/2015 | Tsuruga et al. |
| 9,190,887 B2 | 11/2015 | Ito et al. |
| 9,197,115 B2 | 11/2015 | Kubes et al. |
| 9,446,763 B2 * | 9/2016 | Larkin ................. B60K 6/387 |
| 9,482,286 B2 * | 11/2016 | Qin ..................... F16D 13/38 |
| 9,499,199 B1 | 11/2016 | Laymon et al. |
| 9,840,143 B1 * | 12/2017 | Keller .................. B60K 11/02 |
| 9,855,833 B2 | 1/2018 | Gale et al. |
| 9,866,088 B1 * | 1/2018 | Hauser ................. B60L 11/12 |
| 9,868,343 B2 | 1/2018 | Uranaka et al. |
| 9,896,822 B2 | 2/2018 | Kohno et al. |
| 9,906,172 B2 | 2/2018 | Ross |
| 10,093,169 B1 * | 10/2018 | Keller .................. B60K 11/02 |
| 2004/0045749 A1 | 3/2004 | Jaura et al. |
| 2012/0161554 A1 | 6/2012 | Ghelardi et al. |
| 2013/0043747 A1 | 2/2013 | Kubes |
| 2013/0269456 A1 | 10/2013 | Jones |
| 2015/0059328 A1 | 3/2015 | Suzuki et al. |
| 2015/0064030 A1 | 3/2015 | Suzuki et al. |
| 2015/0132163 A1 | 5/2015 | Wright et al. |
| 2015/0246607 A1 | 9/2015 | Matsuda |
| 2015/0333379 A1 | 11/2015 | Janarthanam et al. |
| 2016/0238004 A1 | 8/2016 | Charwot et al. |

OTHER PUBLICATIONS

U.S. Appl. No. 15/170,137, filed Jun. 1, 2016.
U.S. Appl. No. 15/182,869, filed Jun. 15, 2016.
U.S. Appl. No. 15/205,969, filed Jul. 8, 2016.
U.S. Appl. No. 14/867,911, filed Sep. 28, 2015.

* cited by examiner

DRIVE ASSEMBLY AND SYSTEM FOR UTILITY VEHICLE

CROSS-REFERENCE

This application is a continuation in part of U.S. application Ser. No. 15/170,137 filed Jun. 1, 2016, which claims the benefit of U.S. Provisional App. Ser. No. 62/169,389, filed Jun. 1, 2015; U.S. Provisional App. Ser. No. 62/183, 476, filed Jun. 23, 2015; and U.S. Provisional App. Ser. No. 62/190,015, filed Jul. 8, 2015. The application also claims the benefit of U.S. Provisional App. Ser. No. 62/239,489, filed Oct. 9, 2015. The contents of these prior applications are incorporated herein by reference in their entirety.

BACKGROUND OF THE INVENTION

This invention relates to a drive assembly and system including a combined electric generator and circulating pump that may be used in vehicles such as lawn and garden tractors, stand-on mowers, and the like, including both single transaxle drives and dual transaxle drives for use in zero-turn applications.

SUMMARY OF THE INVENTION

A combined electric generator and circulating pump is disclosed in one embodiment herein. More specifically, in an embodiment disclosed herein, a circulating pump is mounted on the bottom housing member of the generator housing, such that the generator and circulating pump are located adjacent to one another in a stacked configuration. In a further embodiment, a clutch-brake assembly and a generator/circulating pump combination are configured in a side-by-side arrangement in an integrated assembly. In another embodiment, a generator/circulating pump and a clutch-brake are configured in separate assemblies with one assembly belt-driving the other. Each of these embodiments can be located under a prime mover of a vehicle or to one side of a prime mover; i.e., they can be driven by either a vertical or a horizontal output of the prime mover.

In yet another embodiment disclosed herein, a belt-driven generator/circulating pump assembly and a clutch-brake assembly are configured in a stacked arrangement with a driven pulley located between the generator/circulating pump assembly and the clutch-brake assembly. In this embodiment, both the generator/circulating pump assembly and the clutch-brake assembly are driven by a single input, and the circulating pump may be removed from the assembly.

The combined assemblies taught herein may be used in connection with a vehicle, wherein apparatuses on the vehicle are powered by the generator and one or more of these same (or other) apparatuses are cooled by the circulating pump. The circulating pumps of the various assemblies taught herein are preferably modular in nature such that they may be selected or deselected for inclusion by a vehicle or equipment manufacturer as needed without modification of generator housings. This aspect of the present invention is useful because it allows reduced inventory for the generator/circulating pump manufacturer and greater flexibility of vehicle or equipment design enabling lower cost, tailored product offerings for the end user. Vehicles, for example, can be tailored according to light duty, heavy duty, climate, design envelope, etc.

A better understanding of the invention will be obtained from the following detailed descriptions and accompanying drawings, which set forth illustrative embodiments that are indicative of the various ways in which the principals of the invention may be employed.

DETAILED DESCRIPTION OF THE DRAWINGS

Figure 1:
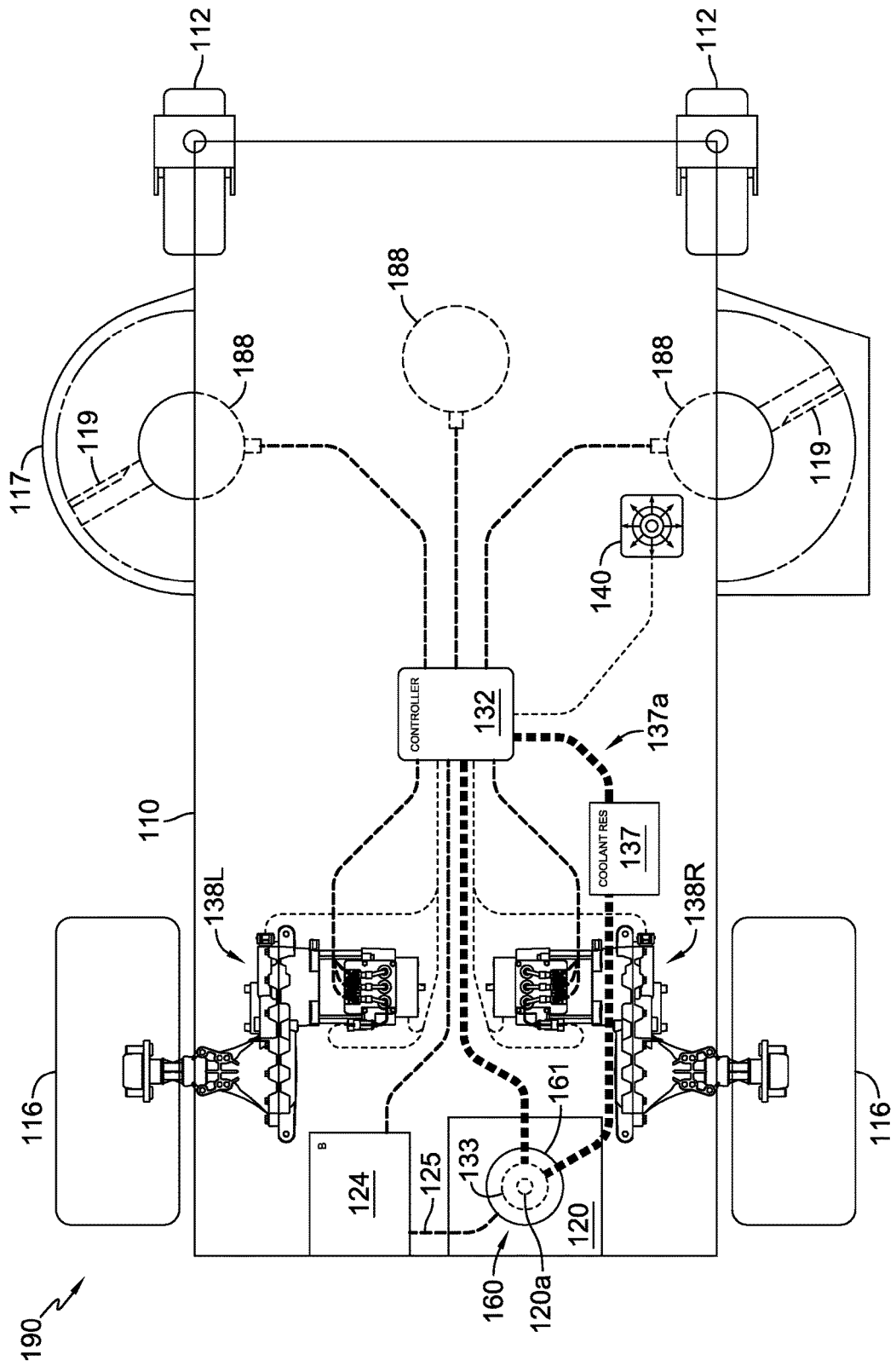
FIG. 1 is a partially schematic drawing of an exemplary vehicle incorporating a combined electric generator and circulating pump assembly.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. Terms used herein such as "upper," "lower," "under," etc., are related to certain components and assemblies as oriented in the figures, and are not limiting as to the scope of the invention. In certain cross-sectional views, not all elements (such as input shafts) are shown as cross-sectioned, where such cross-sectioning would overly complicate the figures and not aid in the understanding of the disclosure. This specification is intended to be taken as a whole and interpreted in accordance with the principles of the invention as taught herein and understood by one of ordinary skill in the art.

FIG. 1 illustrates a riding vehicle 190 including a pair of electric transaxles 138L, 138R to power a pair of driven wheels 116. A set of caster-type wheels 112 is disposed at the front of frame 110, which also supports a mowing deck 117 having at least one mowing blade 119 powered by at least one deck motor 188. A prime mover 120, which may be an internal combustion engine, is also disposed on frame 110. It will be understood that operator input controls and an operating seat or platform for the operator of the vehicles disclosed herein would be provided as well. In this embodiment, an output shaft 120a of prime mover 120 drives a generator and circulating pump assembly 160.

Vehicle 190 also includes a controller 132 supported by frame 110. Controller 132 is operatively connected to a battery 124, electric transaxles 138L, 138R, and to electric deck motors 188. A generator 161 of the generator and circulating pump assembly 160 supplies power to battery 124, which in turn supplies power to controller 132. Controller 132 receives and processes operator input from joystick 140 (or other known operator input devices, such as a steering wheel and accelerator pedal, both equipped with potentiometers or position sensors) to adjust the rotational speed and direction of electric transaxles 138L, 138R. Such connections are made by means of conductors which are depicted schematically and are not further described herein, as they will be understood by one of skill in the art. The generator and clutch-brake designs disclosed herein are similar in some aspects to that depicted in commonly-owned U.S. patent application Ser. No. 14/867,911, the disclosure of which is incorporated herein by reference, and the reader is referred to that disclosure for additional details.

A circulating pump 133 of the generator and circulating pump assembly 160 is connected to various components on vehicle 190 by means of coolant lines 137a. In the embodiment depicted, circulating pump 133 receives cooling fluid from a coolant reservoir 137 and the circulating pump 133 is used to cool the controller 132. Optionally, circulating pump 133 may be used to cool the battery 124 or another component. A manifold (not shown) may be added to the system (e.g., to coolant lines 137a or to a cooled component such as controller 132) to distribute cooling fluid to more than one component of vehicle 190. Coolant reservoir 137 can include a heat exchanger component as needed, dependent on vehicle system requirements. Reservoir 137 may be constructed of a material such as aluminum and may include features such as fins to improve heat dissipation.

Figure 2:
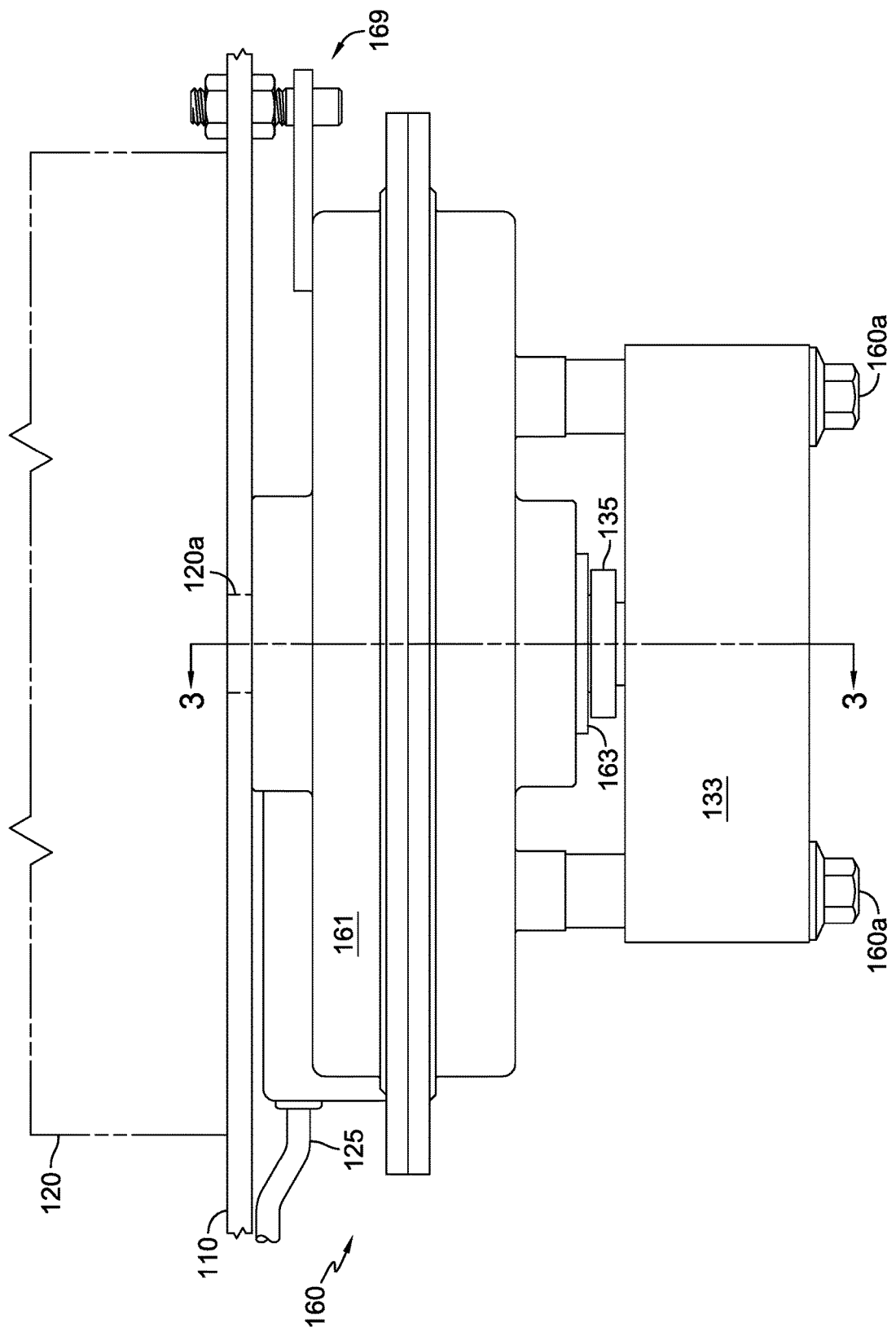
FIG. 2 is a side elevational view of a combined electric generator and circulating pump assembly as represented schematically in FIG. 1.
Figure 3:
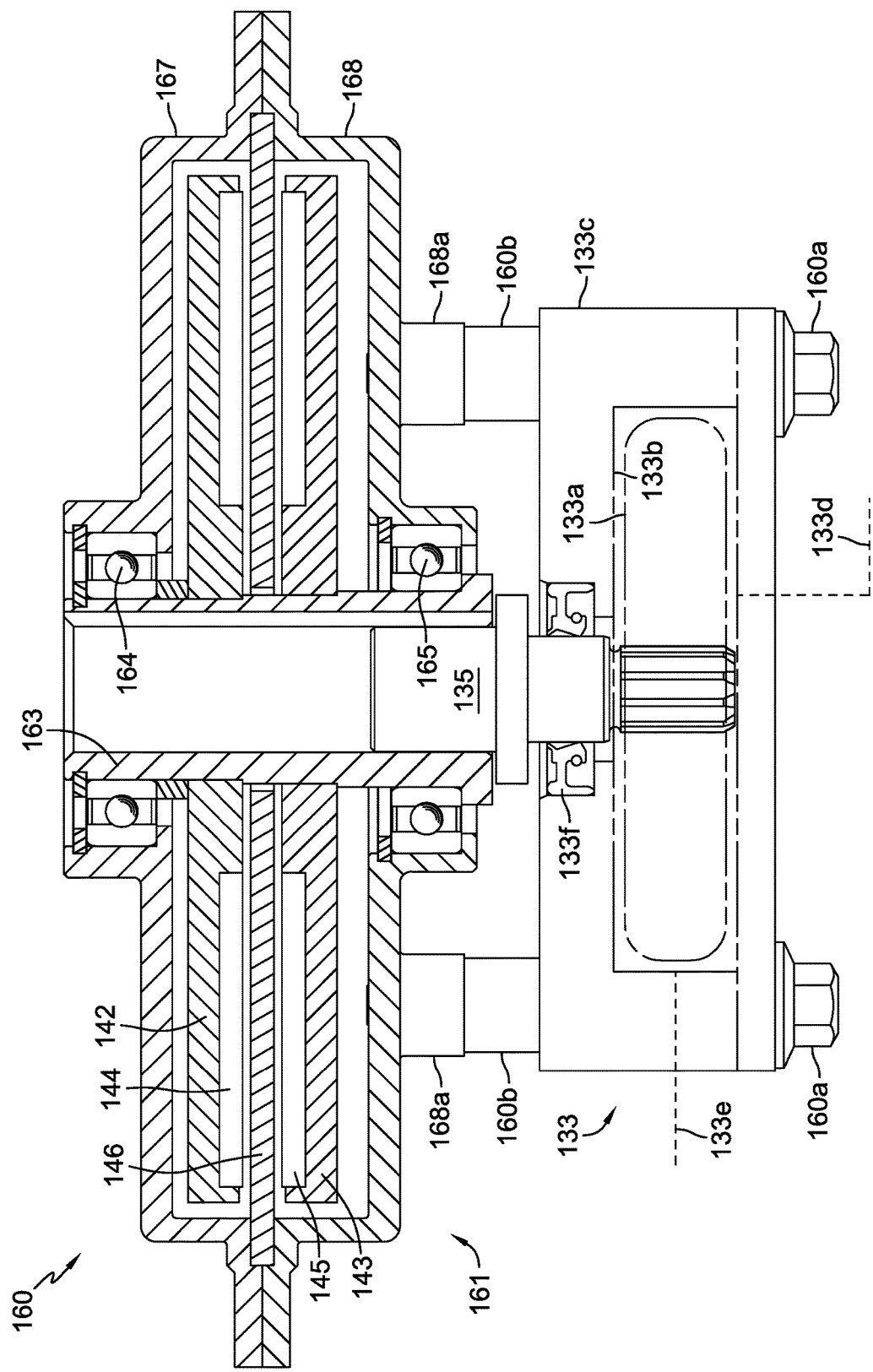
FIG. 3 is a cross sectional view of the combined electric generator and circulating pump assembly of FIG. 2 along line 3-3 in FIG. 2.

An embodiment of a generator/circulating pump assembly 160 is shown in FIGS. 2 and 3, where it can be seen to include a generator 161 having upper housing member 167 and lower housing member 168 forming a single generator housing. The generically illustrated circulating pump 133 is not fully cross-sectioned in FIG. 3 for clarity, as the internal structure of circulating pump 133 is not critical to the disclosure. Circulating pump 133 is attached to the lower housing member 168 using a plurality of fasteners 160a. A spacer structure such as stand-offs 160b is provided to create separation to help maintain a temperature differential between the generator 161 and the circulating pump 133. Stand-offs 160b can be formed as one or more separate components or they can be formed integrally with pump housing 133c. Additionally, protruding mounting bosses 168a can be formed on lower housing member 168 to help create separation and improve airflow between generator 161 and circulating pump 133. Three or four of such combinations of stand-offs 160b and bosses 168a may be used in most applications, although a greater or lesser number could be used, depending on design details of the application. A rotatable input member, namely input tube 163, extends through generator 161 and is supported in part by upper bearing 164 in upper housing member 167 and by lower bearing 165 in lower housing member 168. It is preferred that each of the bearings 164, 165 be sealed bearings to eliminate the need for additional seals, thereby further reducing the height of the overall unit. Output shaft 120a of prime mover 120 will extend into the input tube 163 and is connected thereto by known means (not shown) to rotate therewith. Similarly, an input shaft 135 of circulating pump 133 extends into the opposite end of input tube 163 and is also connected thereto by known means (not shown) to rotate therewith. Input shaft 135 also extends through a seal 133f in housing 133c of circulating pump 133 to engage a fluid moving element 133a disposed in cooling fluid in a pump chamber 133b of circulating pump 133.

It will be understood that other rotatable input means can be used to connect with an output shaft of the prime mover and transfer the rotational movement as outlined herein, in place of the disclosed input tubes. For example, a coupling could be used to connect output shaft 120a to a solid steel input shaft (not shown) used in place of input tube 163.

Generator 161 comprises a stator 146 fixed within housing members 167 and 168 and incorporates coil windings formed in stator 146 in a known manner. Magnets 144 and 145 are fixed on upper rotor 142 and lower rotor 143, respectively, to rotate adjacent stator 146 and generate an electric current in a known manner. The output of generator 161 is provided to battery 124 by means of conductor 125, as shown in FIGS. 1 and 2. At least one anti-rotation device 169 is provided to prevent rotation of generator/circulating pump assembly 160. Optionally, a generator having magnets fixed to a single central rotor and coil windings formed on a peripheral stator may be employed. This optional configuration is also known in the art and may be of low profile design similar to the illustrated generator 161.

Circulating pump 133 includes at least one fluid inlet 133d and one fluid outlet 133e, shown schematically in FIG. 3. These can be configured as needed depending on the design details of circulating pump 133. The size and specific design of circulating pump 133 can vary significantly based on type of coolant fluid used, viscosity, operating temperature range, duty cycle, etc. For example, the cooling fluid could be a water-based antifreeze solution as is commonly used in automotive applications. Or, it could be a higher viscosity hydraulic fluid. Also, a variety of fluids are available for use in computer cooling systems and battery cooling systems and could be used to cool the controller 132 and/or battery 124 and/or other components in vehicle 190. Depending on the cooling fluid used, circulating pump 133 could include an impeller or vane, or it could be a gerotor-style pump.

Figure 4:
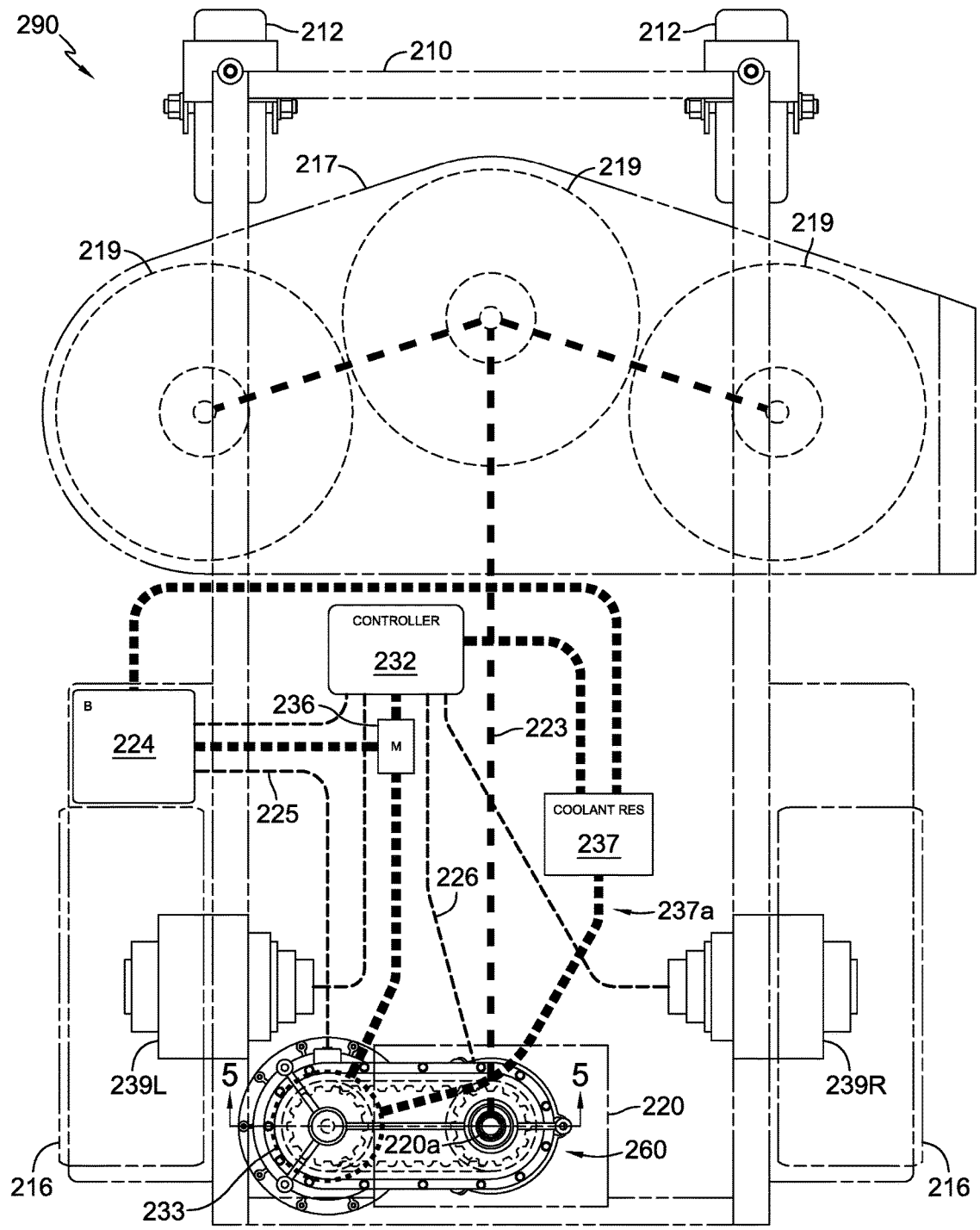
FIG. 4 is a partially schematic drawing of an exemplary vehicle in accordance with another embodiment, wherein the vehicle comprises an integrated electric generator, circulating pump and clutch assembly.
Figure 5:
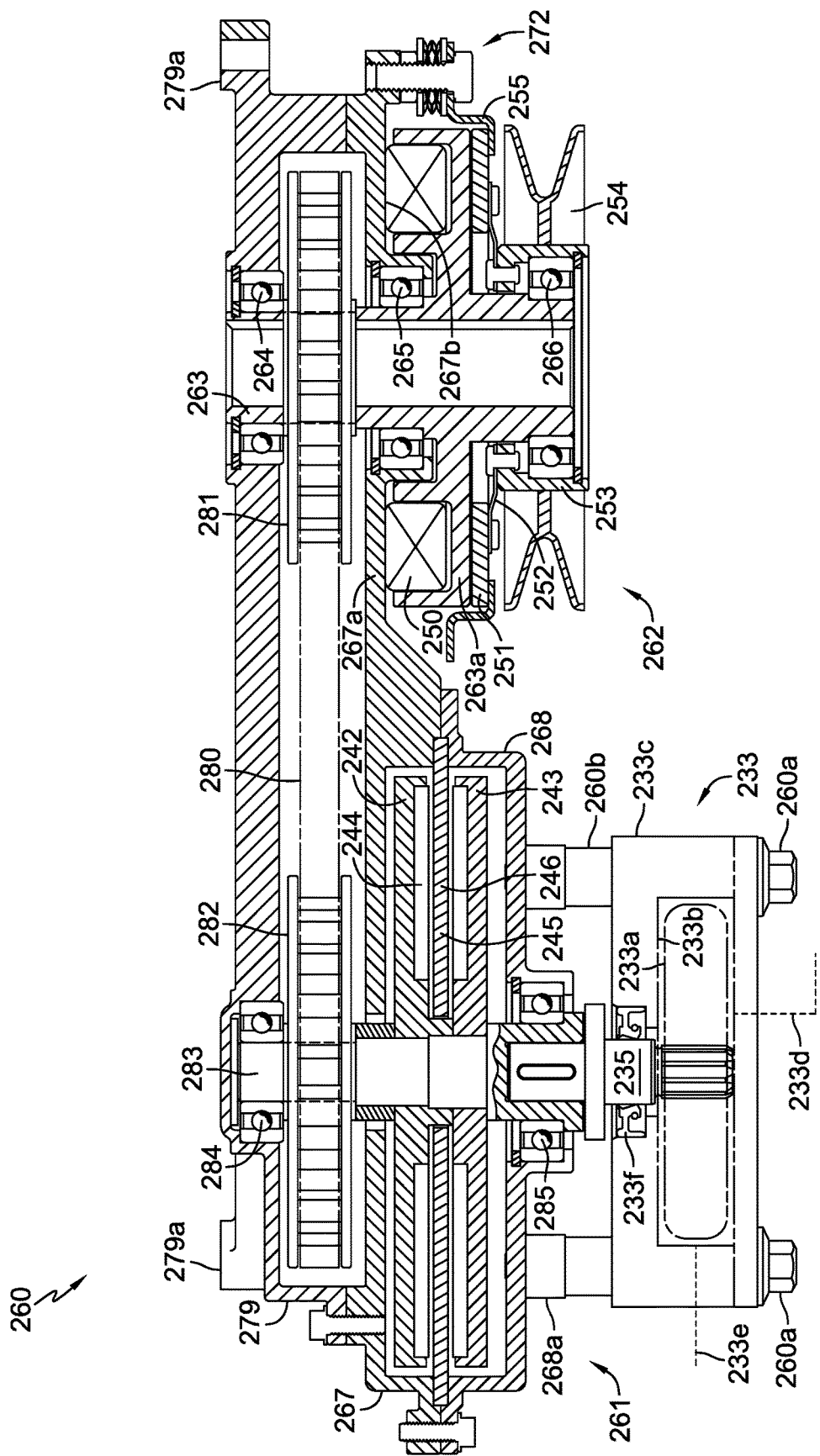
FIG. 5 is a cross sectional view of the combined electric generator, circulating pump and clutch assembly of FIG. 4 along the line 5-5 in FIG. 4.

Another embodiment of a combined generator/circulating pump and electric clutch-brake assembly 260 is shown in FIGS. 4 and 5, where generator 261 and clutch-brake assembly 262 are in a side-by-side configuration and circulating pump 233 is mounted under generator 261 and is driven therewith. FIG. 4 illustrates a riding vehicle 290 including a pair of electric wheel motors 239L, 239R to power a pair of driven wheels 216. A set of caster wheels 212 is disposed at the front of frame 210, which also supports a mowing deck 217 having at least one mowing blade 219. Prime mover 220, which may be an internal combustion engine, is also disposed on frame 210 near the rear thereof. In this embodiment, vehicle 290 includes a belt and pulley system 223 that connects the output shaft 220a of prime mover 220 with mowing blade(s) 219 via clutch-brake assembly 262. Belt and pulley system 223 can be of a standard form and is not critical to this invention. Controller 232 is operatively connected to battery 224 and to wheel motors 239L, 239R, and also supplies power to electric clutch-brake assembly 262 via conductor 226. Generator 261 is connected to battery 224 by means of conductor 225. Similar to the circulating pump 133 in vehicle 190, circulating pump 233 of the combined generator/circulating pump and electric clutch-brake assembly 260 is connected to various components of vehicle 290 by means of coolant lines 237a. Specifically, circulating pump 233 receives cooling fluid from a coolant reservoir 237 and then pumps cooling fluid through a manifold 236 to cool both the battery 224 and the controller 232. Cooling fluid returns from the battery 224 and the controller 232 to the coolant reservoir 237, which can include a heat exchanger component as needed, dependent on vehicle system requirements. In this as in other embodiments, the size and other requirements of the specific coolant lines 237a will be dictated by the components used.

Generator 261 is disposed in a housing comprising upper generator housing member 267 and lower generator housing member 268. As will be described in more detail below, upper generator housing member 267 includes a flange or extension 267a. The shape of upper generator housing member 267 and its ability to serve multiple functions in this design help to minimize parts and reduce size of the overall unit. A stator 246 is fixed within upper generator housing member 267 and lower generator housing member 268 and incorporates coil windings formed in stator 246 in a known manner. Magnets 244 and 245 are fixed on upper rotor 242 and lower rotor 243, respectively, to rotate adjacent stator 246 and generate an electric current in a known manner.

Generator drive belt 280, and the two pulleys 281, 282 are housed between a drive belt cover 279 and the upper generator housing member 267 which cooperate to form a transfer housing. Clutch-brake assembly 262 is directly connected to prime mover output shaft 220a via a rotatable input member, namely input tube 263, which also drives a driving pulley 281. A generator drive belt 280 connects the driving pulley 281 to a driven pulley 282 which then rotates the generator drive shaft 283. It will be understood that this arrangement could be reversed, with prime mover output shaft 220a driving a modified generator directly, and a modified clutch-brake assembly being powered by a belt and pulley arrangement. It will also be understood that although a timing belt system is shown, a standard belt and pulley system disposed in a similar transfer housing disposed above generator 261 and clutch-brake assembly 262 could be used in place of drive belt 280 and pulleys 281, 282.

Drive belt cover 279 also may include a plurality of mounting bosses 279a spaced appropriately to permit drive belt cover 279 and the entire generator/circulating pump and electric clutch-brake assembly 260 to be mounted to the bottom of prime mover 220 and/or to the vehicle frame 210. Drive shaft 283 may be supported by upper bearing 284 located in drive belt cover 279 and lower bearing 285 in lower generator housing member 268. In a configuration similar to input shaft 135 of circulating pump 133, input shaft 235 of circulating pump 233 extends into the lower end of drive shaft 283 and is connected thereto by known means to rotate therewith. Optionally, drive shaft 283 and input shaft 235 could be configured for joining by a coupling (not shown). If a coupling is used, the modified input shaft 235 may require bearing support in housing 233c. Bearings may be used as needed in circulating pumps 133, 233 to provide additional shaft support and extend service life.

Electric clutch-brake assembly 262 is used in combination with generator 261 to selectively connect output hub 253 and pulley 254 to input tube 263. Input tube 263 also comprises clutch rotor 263a formed therewith, and it will be understood that the output shaft 220a of prime mover 220 will extend into the input tube 263 and is connected thereto by known means, so that input tube 263 rotates with the prime mover output shaft 220a.

Bearings, including upper bearing 264 in drive belt cover 279 and intermediate bearing 265 in upper generator housing member 267, are used to support input tube 263. A lower bearing 266 is located in output hub 253 to support rotation of output hub 253 and pulley 254 when the clutch is engaged. It is preferred that each of the bearings 264, 265, 266 be sealed bearings to eliminate the need for additional seals, thereby helping to reduce the height of the overall unit.

A field coil 250 is used to activate the clutch function of the clutch-brake assembly 262, as seen in FIG. 5. Field coil 250 is fixed by known methods, such as adhesives, to an external surface 267*b* of the flange or extension 267*a* of upper generator housing member 267 to provide a compact arrangement. This arrangement reduces the overall height of the assembly 260, thereby conserving ground clearance in utility vehicles such as riding vehicle 290. Field coil 250 is powered by conductor 226 connected to controller 232. Clutch-brake disk 251 is fixed to output hub 253 and engages the inner surface of brake shroud 255 to provide a braking force to output hub 253. Clutch-brake disk 251 is biased to this braking position by means of a plurality of leaf springs 252. When field coil 250 is energized, clutch-brake disk 251 is magnetically pulled to engage clutch rotor 263*a*, thereby engaging the output hub 253 and pulley 254 with input tube 263 to provide rotational output thereto. It will be understood that frictional material will be used on certain clutch-brake components as needed.

Brake shroud 255 is secured to the generator upper housing member 267 by a plurality of adjustment mechanisms 272. Gap adjustment mechanisms 272 permit the distance between clutch-brake disk 251 and clutch rotor 263*a* to be set and adjusted as needed. The gap adjustment mechanisms 272 act both to retain the brake shroud 255 and permit necessary adjustments, e.g., as clutch-brake disk 251 wears.

Figure 6:
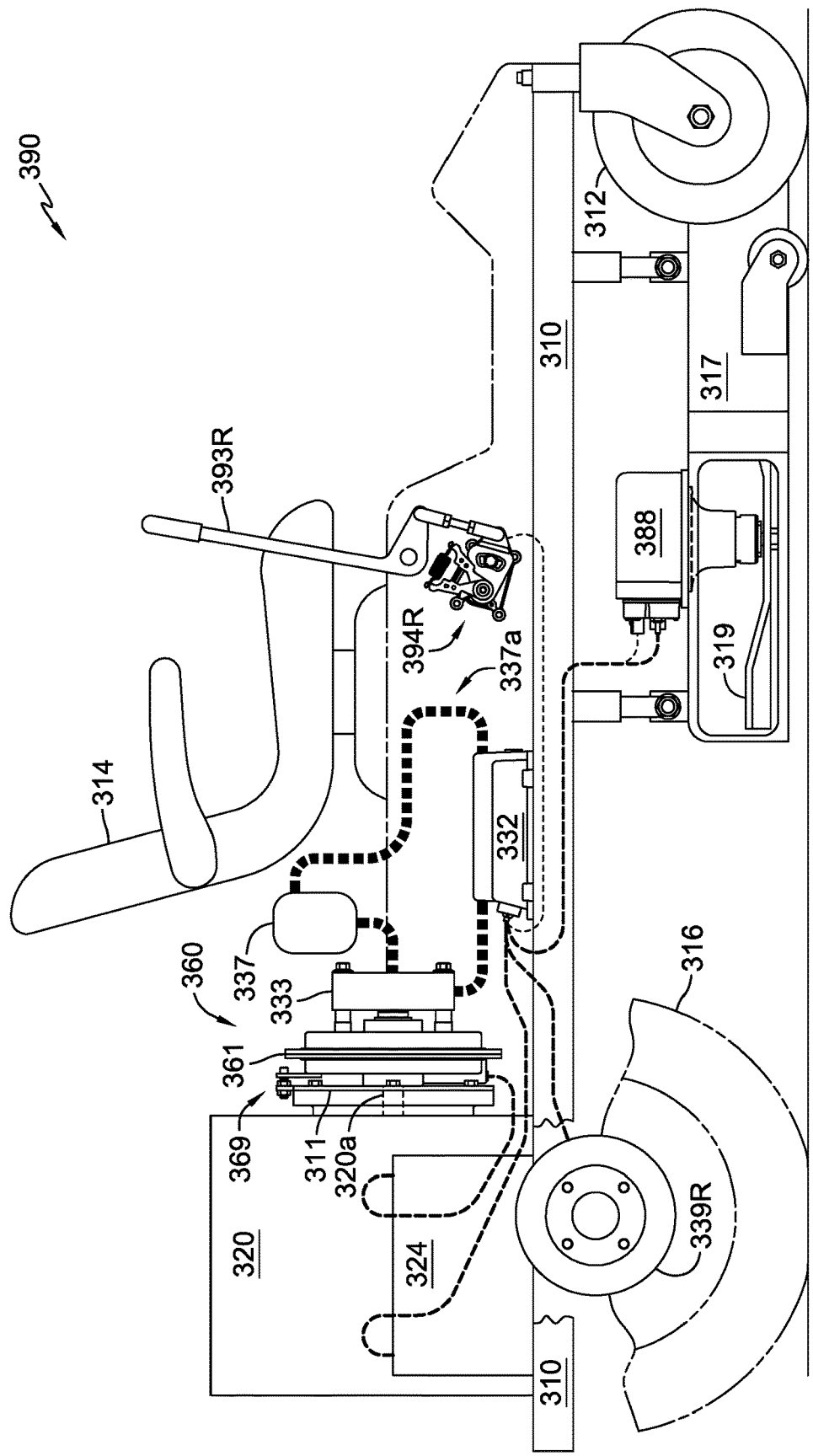
FIG. 6 is a side elevational view of another exemplary vehicle incorporating a combined electric generator and circulating pump assembly similar to that of FIG. 2.

FIG. 6 illustrates a riding vehicle 390 that is similar to vehicle 190 in some aspects, but having a prime mover 320 with a horizontal output shaft 320*a* to drive a generator and circulating pump assembly 360, which can be of basically the same configuration as generator and circulating pump assembly 160. At least one anti-rotation device 369 is provided to prevent rotation of generator and circulating pump assembly 360. Generator and circulating pump assembly 360 may be mounted on an adapter plate 311 attached to prime mover 320 and anti-rotation device 369 may be secured to adapter plate 311. Vehicle 390 includes a pair of electric wheel motors 339L, 339R (339R shown) to power a pair of driven wheels 316. A set of caster wheels 312 is disposed at the front of frame 310, which also supports a mowing deck 317 having at least one mowing blade 319 powered by at least one deck motor 388. Prime mover 320, which may be an internal combustion engine, is also disposed on frame 310. Vehicle 390 includes an operator seat 314 in proximity to a pair of operator control levers 393L, 393R (393R shown). The pair of operator control levers 393L, 393R is connected to a corresponding pair of potentiometers or position sensors 394L, 394R (394R shown) that impart operator speed and steering signals to a controller 332 to adjust the rotational speed and direction of electric wheel motors 339L, 339R (339R shown), including the potential execution of zero radius turns when each of the wheels 316 is driven in the opposite rotational sense. As shown in FIG. 6, control assemblies such as position sensors 394L, 394R may include a return to neutral bias mechanism as depicted in U.S. patent application Ser. No. 14/693,255, the disclosure of which is incorporated herein by reference.

Controller 332 is supported by frame 310 at any appropriate location on frame 310 and is operatively connected to a battery 324, electric wheel motors 339L, 339R, and to one or more electric deck motors 388. A generator 361 of the generator and circulating pump assembly 360 supplies power to battery 324, which in turn supplies power to controller 332. Optionally, controller 332 may comprise two controllers packaged in one or two housings wherein a first controller is provided to control the electric wheel motors 339L, 339R and a second controller is provided to control the electric deck motor(s) 388, and the first controller and second controller are in CAN Bus communication with one another.

A circulating pump 333 of the generator and circulating pump assembly 360 receives cooling fluid from a coolant reservoir 337. In this vehicle system, the circulating pump 333 is used to cool the controller 332. Optionally, circulating pump 333 may be used to cool the battery 324 or another component. A manifold (not shown) may be added to the system to distribute cooling fluid to more than one component of vehicle 390. Coolant reservoir 337 can include a heat exchanger component as needed, dependent on vehicle system requirements. Coolant reservoir 337 may be constructed of a material such as aluminum and may include features such as fins to improve heat dissipation. Coolant lines 337*a* are used to connect circulating pump 333 and the various cooled components of vehicle 390.

Figure 7:
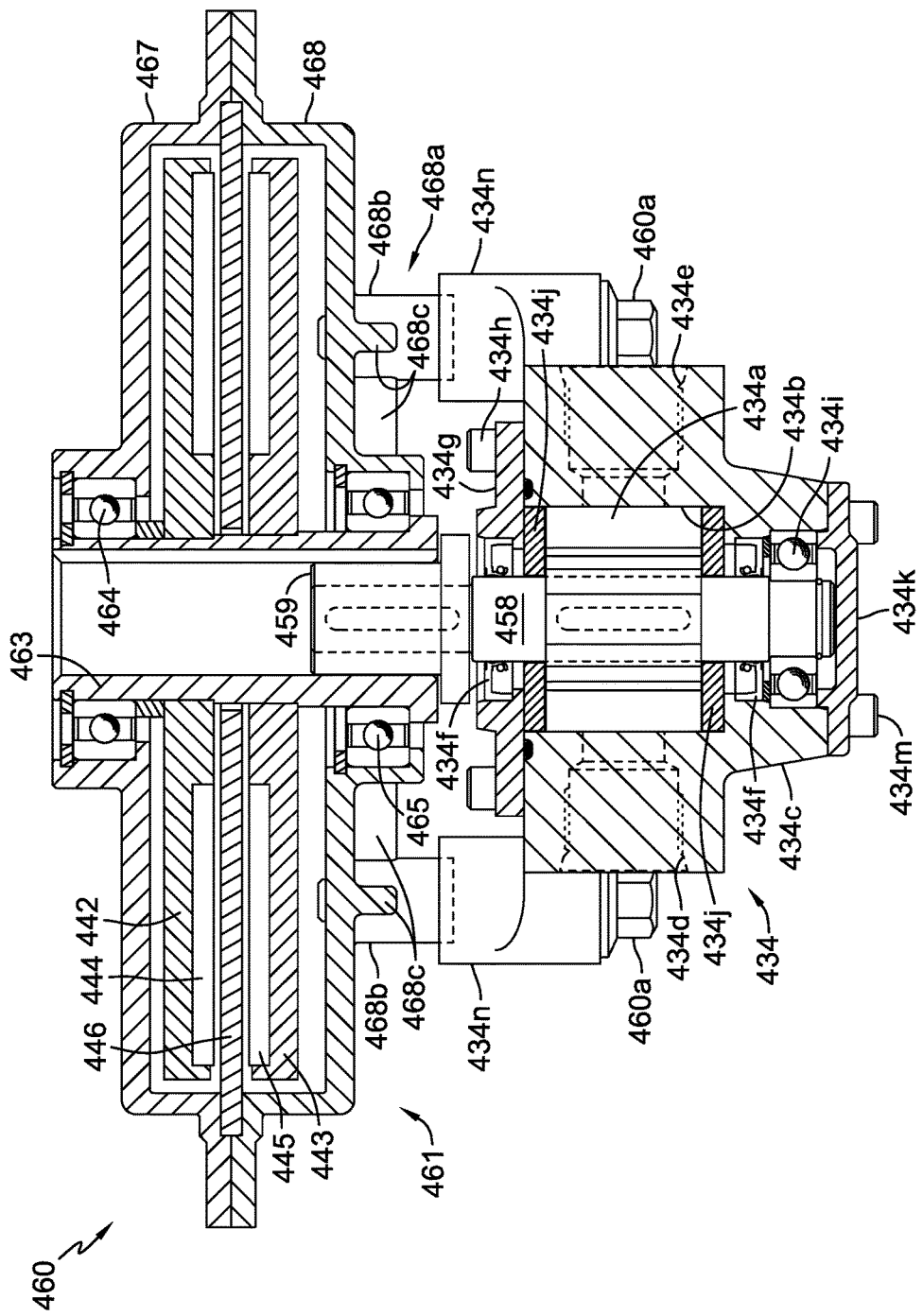
FIG. 7 is a cross sectional view of an embodiment of a combined electric generator and circulating pump assembly.

A combined generator and circulating pump assembly 460, similar in some aspects to combined generator and circulating pump assembly 160, is shown in FIG. 7, where it can be seen to include a low profile generator 461 having upper housing member 467 and lower housing member 468 forming a single generator housing. Generator 461 comprises a stator 446 fixed within housing members 467 and 468 and incorporates coil windings applied to stator 446 in a known manner. Magnets 444 and 445 are fixed on upper rotor 442 and lower rotor 443, respectively, to rotate adjacent to stator 446 and generate an electric current in a known manner. Alternatively, a more conventional low profile generator design (not shown) can be used, wherein magnets are attached to a central rotor, and coil windings are applied to a cylindrical stator positioned about the perimeter of the rotor. The output of generator 461 is provided to battery 424 by means of conductor 425. As in combined generator and circulating pump assembly 160, an anti-rotation device (not shown) is provided to prevent rotation of generator/circulating pump assembly 460.

Circulating pump 434 is attached to the lower housing member 468 using a plurality of fasteners 460*a*. A plurality of piloted mounting bosses 434*n* is provided for ease of mounting and proper alignment of circulating pump 434 and to create separation to help maintain a temperature differential between the generator 461 and the circulating pump 434. Additionally, a pump mounting structure 468*a* comprising a plurality of protruding mounting features 468*b* (that engage piloted mounting bosses 434*n*) may be formed on lower housing member 468 to further help create separation and improve cooling airflow. Reinforcing ribs 468*c* may be formed between mounting bosses 468*b* to add strength and act as fins to augment heat dissipation. A rotatable input member, or input receiving member, namely input tube 463, extends through generator 461 and is supported by upper bearing 464 in upper housing member 467 and by lower bearing 465 in lower housing member 468. As described in conjunction with combined generator and circulating pump assembly 160, an output shaft of a prime mover will extend into the input tube 463 and is connected thereto by known means, such as splines, flats, keyway (shown), etc., to rotate therewith.

Similarly, an adapter coupling 459 extends into the opposite end of input tube 463 and an input shaft 458 of circulating pump 434 engages adapter coupling 459 in a known manner to rotate therewith. Input shaft 458 extends through a first seal 434*f* located in housing cover 434*g* to engage a fluid moving element or impeller 434*a* disposed in cooling fluid in pump chamber 434*b* of circulating pump 434. Impeller 434a may be made of rubber or an elastomeric material and runs on a pair of wear washers 434j. Input shaft 458 also extends through a second seal 434f located in main housing 434c and is supported by at least one shaft support bearing 434i mounted in main housing 434c. An additional shaft support bearing may be added to improve load distribution and shaft alignment if necessary. One or more weep holes (not shown) may be included external to seals 434f to visually indicate seal leakage. In the embodiment shown, input shaft 458 extends through a housing cover 434g attached to main housing 434c with a plurality of fasteners 434h. A bearing retention cover 434k, attached to main housing 434c with a plurality of fasteners 434m, retains bearing 434i and input shaft 458 in main housing 434c.

As noted previously herein, a coupling could be used to connect a prime mover output shaft to an alternative solid steel input shaft used in place of generator input tube 463. A different style of coupling replacing coupling 459 could then be used to connect this alternative shaft to the pump input shaft 458.

Circulating pump 434 includes a fluid inlet 434d and a fluid outlet 434e. The arrangement of the fluid inlet 434d and fluid outlet 434e on opposite sides of pump input shaft 458 as shown would also be useful for a through-shaft pump configuration wherein the through-shaft drives an output pulley (not shown). The size and specific design of circulating pump 434 may vary based on type of coolant fluid used, viscosity, operating temperature range, duty cycle, etc.

The circulating pump 434 illustrated herein is an appropriate pump for use with a water-based antifreeze solution as is commonly used in automotive applications. A centrifugal pump is an alternative, well-known style of automotive water pump that may also be suitable for use with a low profile generator configuration such as is illustrated herein.

Figure 8:
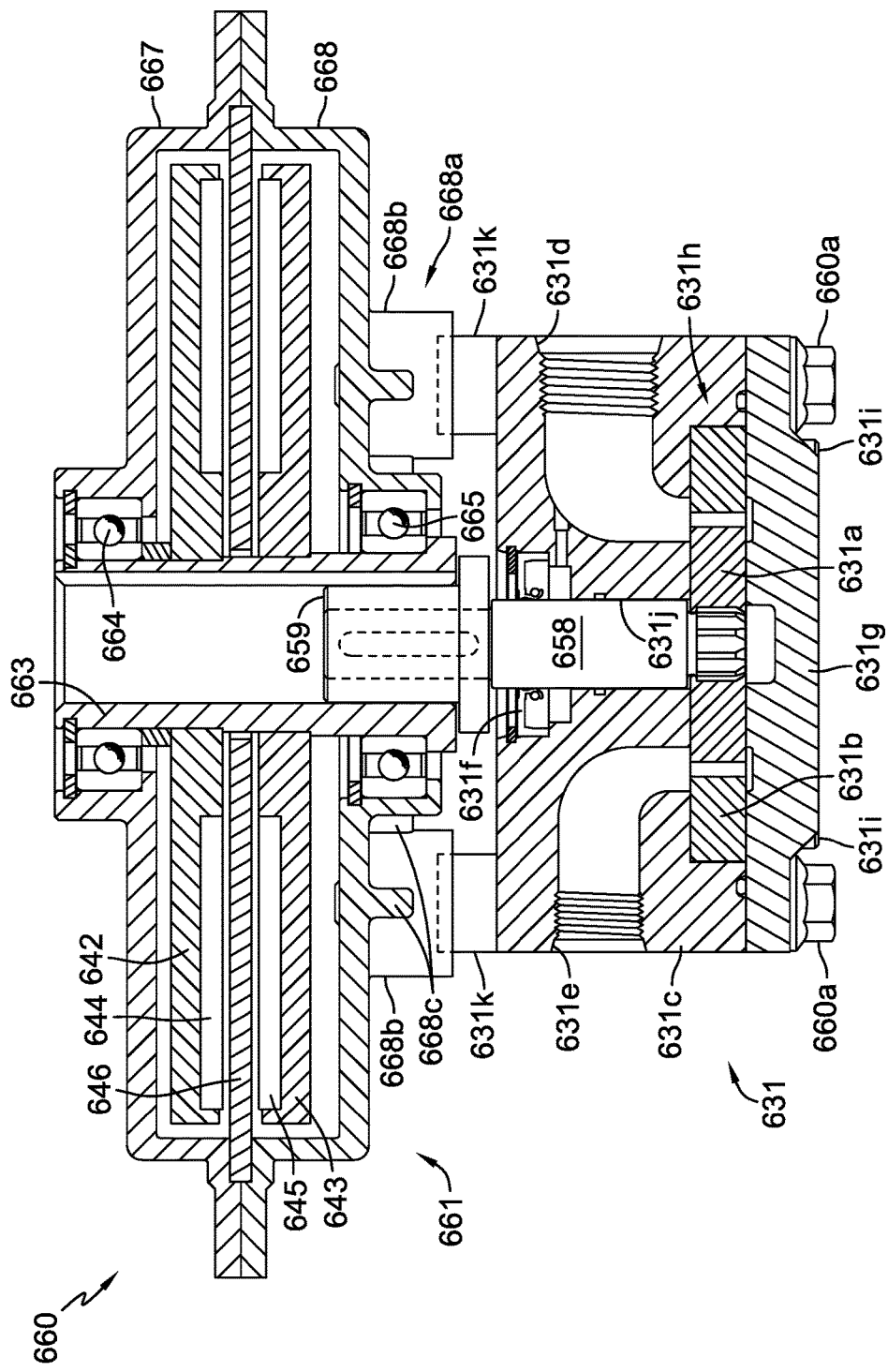
FIG. 8 is a cross sectional view of another embodiment of a combined electric generator and circulating pump assembly.

In yet another embodiment, depending on the cooling fluid used, e.g., an oil-based or other fluid with lubricating properties, a gerotor-style pump 631 may be used in place of circulating pump 434, resulting in a lower profile generator and circulating pump assembly 660, as illustrated in FIG. 8.

The combined generator and circulating pump assembly 660 includes a low profile generator 661 having upper housing member 667 and lower housing member 668 forming a single generator housing. As in combined generator and circulating pump assembly 160, an anti-rotation device (not shown) is provided to prevent rotation of generator/circulating pump assembly 660. A pump mounting structure 668a comprising a plurality of piloted mounting bosses 668b may be formed on lower housing member 668 to provide ease of mounting and proper alignment of circulating pump 631. Reinforcing ribs 668c may be formed between mounting bosses 668b to add strength and act as fins to augment heat dissipation.

Circulating pump 631 is attached to the lower housing member 668 using a plurality of fasteners 660a. Protruding mounting features 631k formed on main housing 631c engage piloted mounting bosses 668b at assembly. A rotatable input tube 663 extends through generator 661 and is supported by upper bearing 664 in upper housing member 667 and by lower bearing 665 in lower housing member 668. An output shaft of a prime mover will extend into the input tube 663 and is connected thereto by known means to rotate therewith.

Similarly, an adapter coupling 659 extends into the opposite end of input tube 663 and an input shaft 658 of circulating pump 631 engages adapter coupling 659 in a known manner to rotate therewith. Input shaft 658 extends through a seal 631f located in main housing 631c to engage inner rotor 631a of circulating pump 631. Inner rotor 631a and outer rotor 631b are disposed in cooling fluid in gerotor pocket 631h formed in the main housing 631c of circulating pump 631. Input shaft 658 may be supported by a machined bearing surface 631j formed in main housing 631c, as shown, or by alternative means, such as installed bearings. In the embodiment shown, a housing cover 631g is attached to main housing 631c with a plurality of fasteners 631i and provides a running surface for inner rotor 631a and outer rotor 631b, as does the gerotor pocket 631h.

Circulating pump 631 includes a fluid inlet 631d and a fluid outlet 631e. The arrangement of the fluid inlet 631d and fluid outlet 631e on opposite sides of pump input shaft 658 as shown would also be useful for a through-shaft pump configuration wherein the through-shaft drives an output pulley (not shown). The size and specific design of circulating pump 631 may vary based on type of coolant fluid used, viscosity, operating temperature range, duty cycle, etc.

Figure 9:
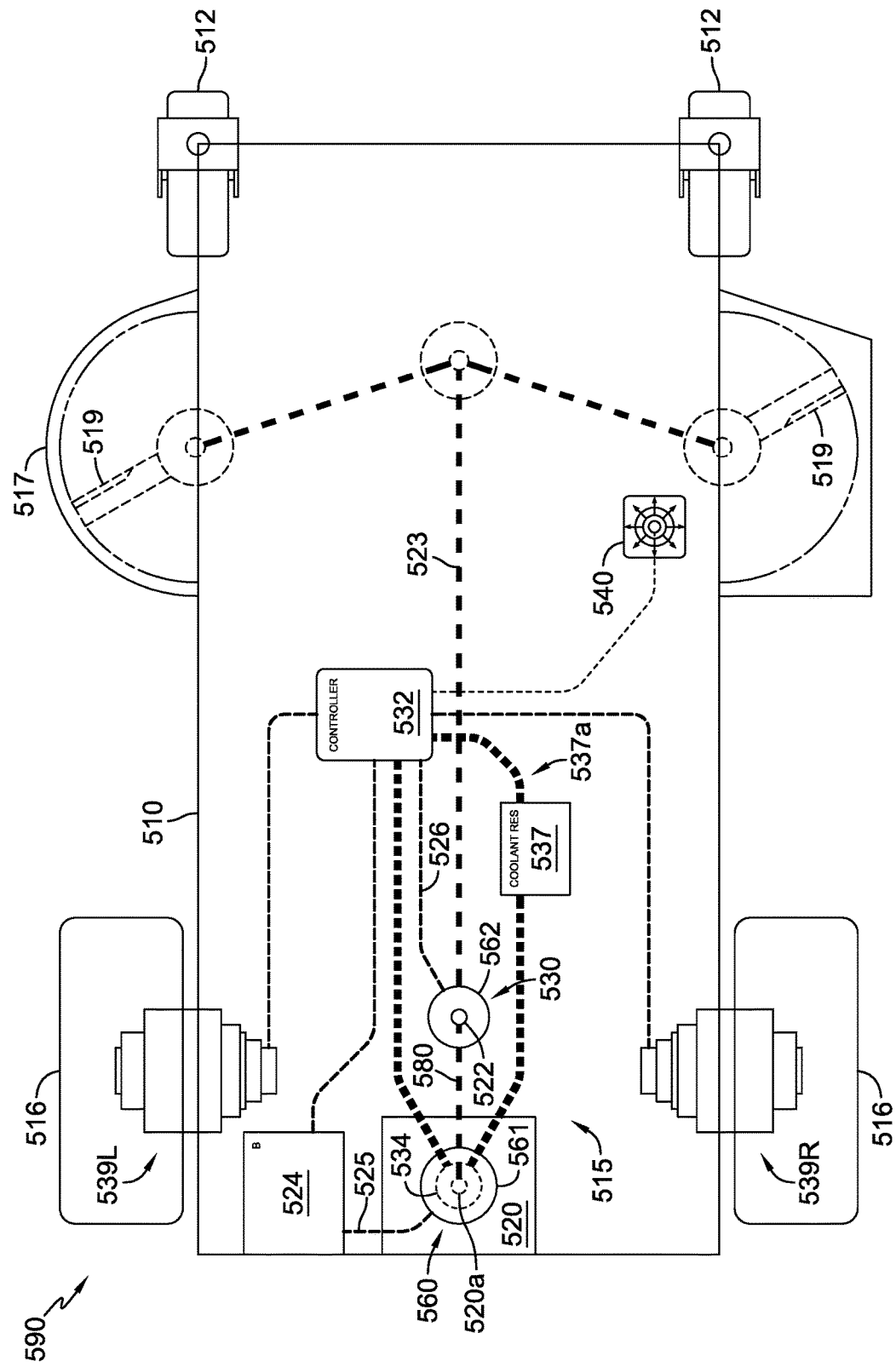
FIG. 9 is a partially schematic drawing of an exemplary vehicle in accordance with a further embodiment, wherein the vehicle comprises a combined electric generator and circulating pump assembly and a separate spindle-mounted clutch assembly.
Figure 10:
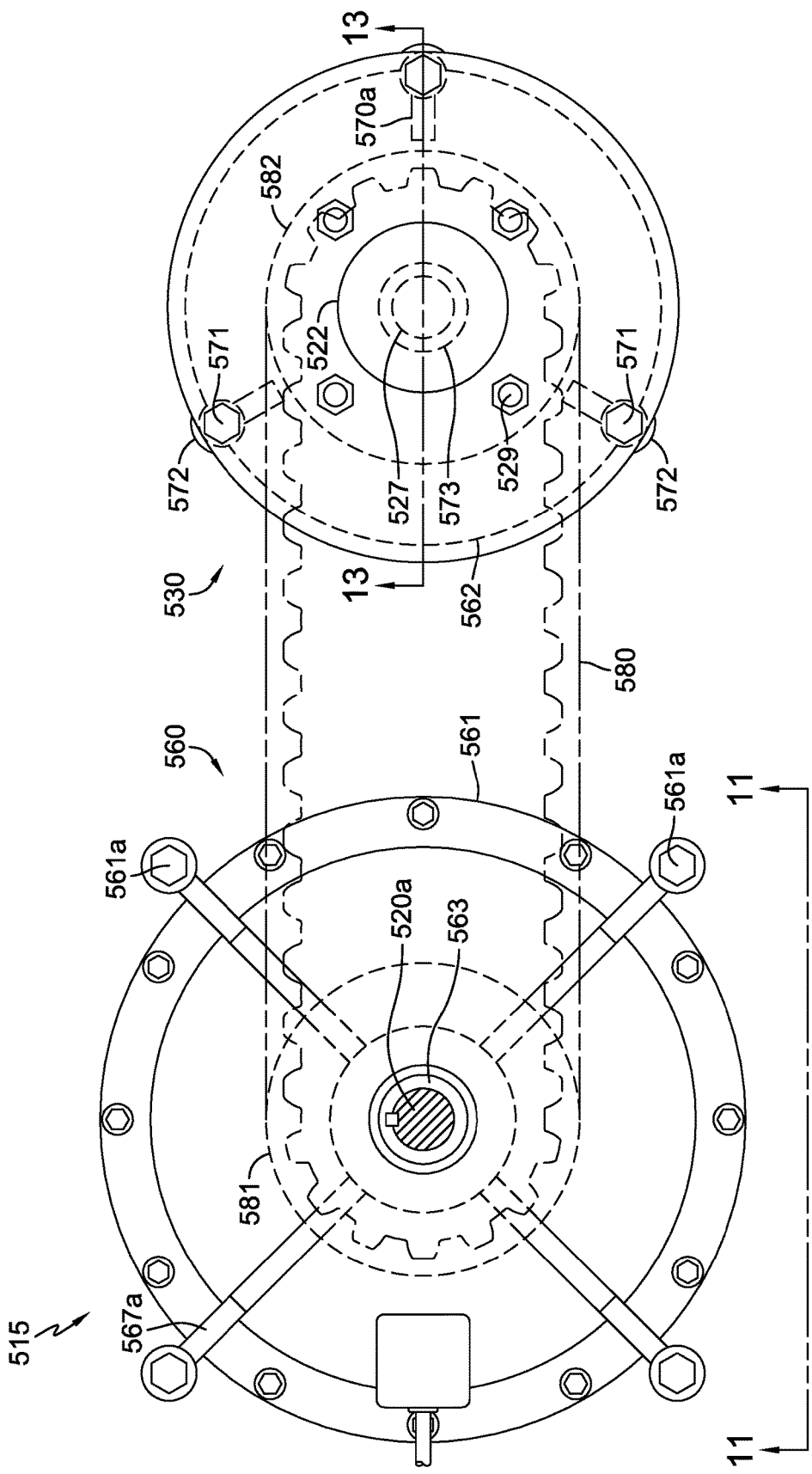
FIG. 10 is a top plan view of the combined electric generator and circulating pump assembly and spindle-mounted clutch assembly of FIG. 9.
Figure 11:
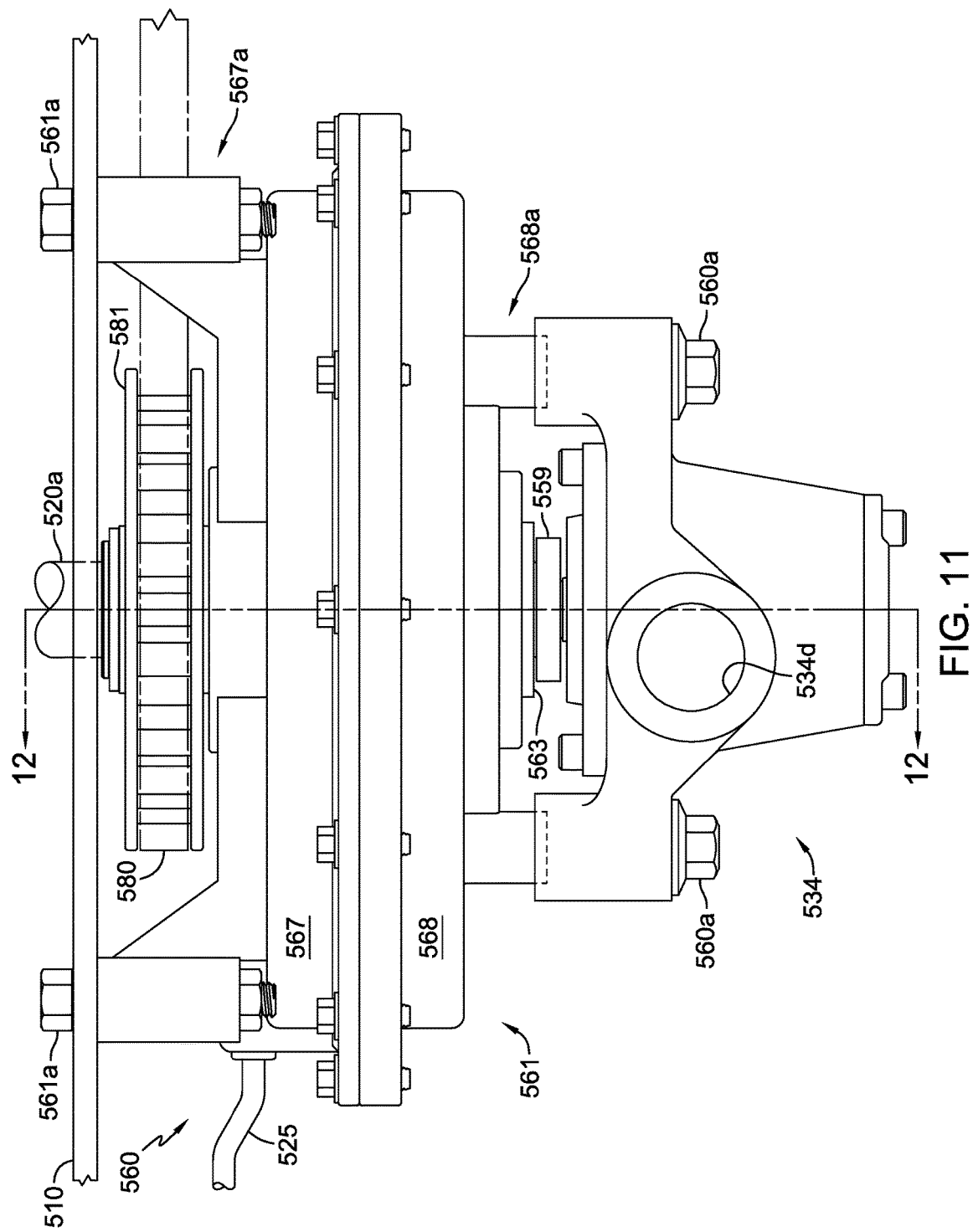
FIG. 11 is a side elevational view of the combined electric generator and circulating pump assembly of FIG. 10 along the line 11-11 in FIG. 10.
Figure 12:
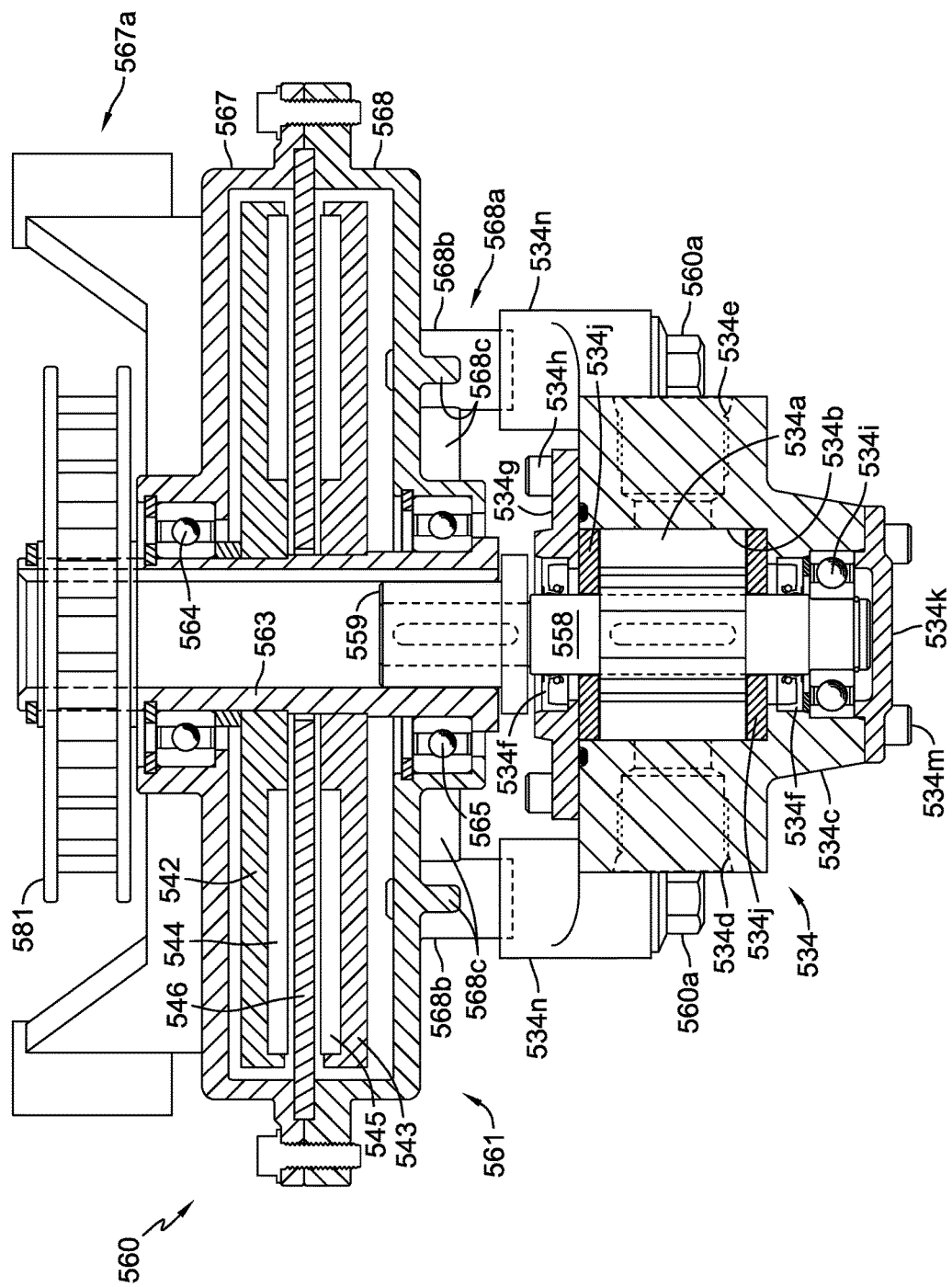
FIG. 12 is a cross sectional view of the combined electric generator and circulating pump assembly of FIG. 11 along the line 12-12 in FIG. 11.

FIGS. 9 through 13 illustrate a riding vehicle 590 and a power generation and transfer assembly 515 thereof. As shown in FIG. 9, vehicle 590 includes a pair of electric wheel motors 539L, 539R drivingly attached to a pair of driven wheels 516. A set of caster wheels 512 is disposed at the front of frame 510, which also supports a mowing deck 517 having at least one mowing blade 519 driven by a standard belt and pulley system 523 via output pulley 554 of clutch-brake 562. A prime mover 520, which may be an internal combustion engine, is disposed on frame 510 near the rear thereof and output shaft 520a of prime mover 520 drives the power generation and transfer assembly 515.

Power generation and transfer assembly 515 includes a generator and circulating pump assembly 560 and a spindle-mounted clutch-brake assembly 530. Generator and circulating pump assembly 560 includes a generator 561 and a circulating pump 534; spindle-mounted clutch-brake assembly 530 includes a spindle 522 and a clutch-brake 562. In vehicle 590, an input device or pulley 582 of clutch-brake 562 is driven by a connecting device or belt 580 connected to an output device or pulley 581 engaged to the input member (input tube 563) of generator 561. It should be noted, however, that the drive relationship between generator 561 and clutch-brake 562 is reversible. i.e., output shaft 520a can drive clutch-brake 562 which, in turn, drives generator 561 via belt 580. In this reverse arrangement, which is similar in some aspects to the drive arrangement depicted in FIGS. 4 and 5, spindle 522 would be omitted. It will also be understood that although a timing belt system is shown, a standard belt and pulley system could be used in place of drive belt 580 and pulleys 581, 582.

Vehicle 590 includes a controller 532 that is operatively connected to a battery 524 and to electric wheel motors 539L, 539R. Generator 561 supplies power to battery 524 via conductor 525, and battery 524 supplies power to controller 532. Controller 532 receives and processes operator input from joystick 540 (or other known operator input devices, such as a steering wheel and accelerator pedal, both equipped with potentiometers or position sensors) to adjust the rotational speed and direction of electric wheel motors 539L, 539R.

Circulating pump 534 is connected to various coolant lines 537a and receives cooling fluid from a coolant reservoir 537. In this vehicle system, the circulating pump 534 is used to cool the controller 532. Optionally, circulating pump 534 may be used to cool the battery 524 or another component. A manifold (not shown) may be added to the system to distribute cooling fluid to more than one component of vehicle 590 and may include a valve if needed (as may other vehicle system embodiments described herein). Coolant reservoir 537 can include a heat exchanger component if needed, and may be constructed of a material such as aluminum and may include features such as fins to improve heat dissipation.

Generator 561 is disposed in a housing comprising upper generator housing member 567 and lower generator housing member 568. A stator 546 is fixed within upper generator housing member 567 and lower generator housing member 568 and incorporates coil windings formed in stator 546 in a known manner. Magnets 544 and 545 are fixed on upper rotor 542 and lower rotor 543, respectively, to rotate adjacent stator 546 and generate an electric current in a known manner.

Generator 561 is directly connected to output shaft 520a via a rotatable input member, namely input tube 563, which also drives pulley 581, affixed to input tube 563 in a known manner to rotate therewith. Upper generator housing member 567 includes a mounting structure 567a that allows generator and circulating pump assembly 560 to be mounted to the vehicle frame 510 via fasteners 561a, as shown. Alternatively, fasteners 561a may extend through frame 510 to attach generator and circulating pump assembly 560 to the bottom of prime mover 520. Fasteners 561a are representative of a common, easily serviceable fastening method, but fasteners 561a could be of another suitable known form. Input tube 563 may be supported by upper bearing 564 located in upper generator housing member 567 and by lower bearing 565 located in lower generator housing member 568. Input shaft 558 of circulating pump 534 extends into a coupling 559 engaged to the lower end of input tube 563 and is connected thereto by known means to rotate therewith.

Pump input shaft 558 is supported by at least one bearing 534i in housing 534c of circulating pump 534. Bearings may be used as needed in circulating pump 534 to provide additional shaft support and extend service life. Circulating pump 534 may be of the same design as circulating pump 434 described previously herein and is attached via fasteners 560a to a pump mounting structure 568a that is the same as or similar to pump mounting structure 468a, also described previously herein.

Similar in function to electric clutch-brake assembly 262, electric clutch-brake 562 is used to selectively connect output hub 553 and pulley 554 to input tube 573. Input tube 573 comprises clutch rotor 573a formed therewith, as shown, or otherwise engaged thereto, and it will be understood that a shaft 527 of spindle assembly 522 will extend into the input tube 573 and is connected thereto by known means, so that input tube 573 and clutch rotor 573a rotate with spindle shaft 527. Shaft 527 is supported by a pair of bearings 528. Spindle 522 includes a mounting flange 522a for attachment of spindle 522 to vehicle frame 510 via fasteners 529. Upper bearing 574, located in field coil mounting plate 570, and lower bearing 576 are used to support input tube 573 and output hub 553, respectively. Input pulley 582 is affixed to input tube 573 in a known manner to rotate therewith.

Field coil 550 is fixed to field coil mounting plate 570 and is used to activate the clutch function of clutch-brake 562. Field coil 550 is powered by conductor 526 connected to controller 532. Clutch-brake disk 551 is fixed to output hub 553 and engages the inner surface of brake shroud 555 to provide a braking force to output hub 553. Clutch-brake disk 551 is biased to this braking position by means of a plurality of leaf springs 552. When field coil 550 is energized, clutch-brake disk 551 is magnetically pulled to engage clutch rotor 573a, thereby engaging the output hub 553 and pulley 554 with input tube 573 to provide rotational output thereto. It will be understood that frictional material will be used on certain clutch-brake components as needed.

Brake shroud 555 is secured to the field coil mounting plate 570 by a plurality of gap adjustment mechanisms 572. As shown, field coil mounting plate 570 includes a mounting structure 570a whereby clutch-brake 562 is attached to vehicle frame 510 via fasteners 571. In the embodiment shown, fasteners 571 extend through mounting flange 522a and vehicle frame 510 to engage mounting structure 570a. In this embodiment, fasteners 571 extend through mounting flange 522a to ensure acceptable axial alignment of spindle shaft 527 with input tube 573. Alternatively, the size of mounting flange 522a can be reduced and fasteners 571 can attach mounting structure 570a directly to vehicle frame 510 without extending through mounting flange 522a. Although three mounting points (and fasteners 571) are shown, at least one mounting point is required to prevent rotation of mounting plate 570 and field coil 550.

Figure 14:
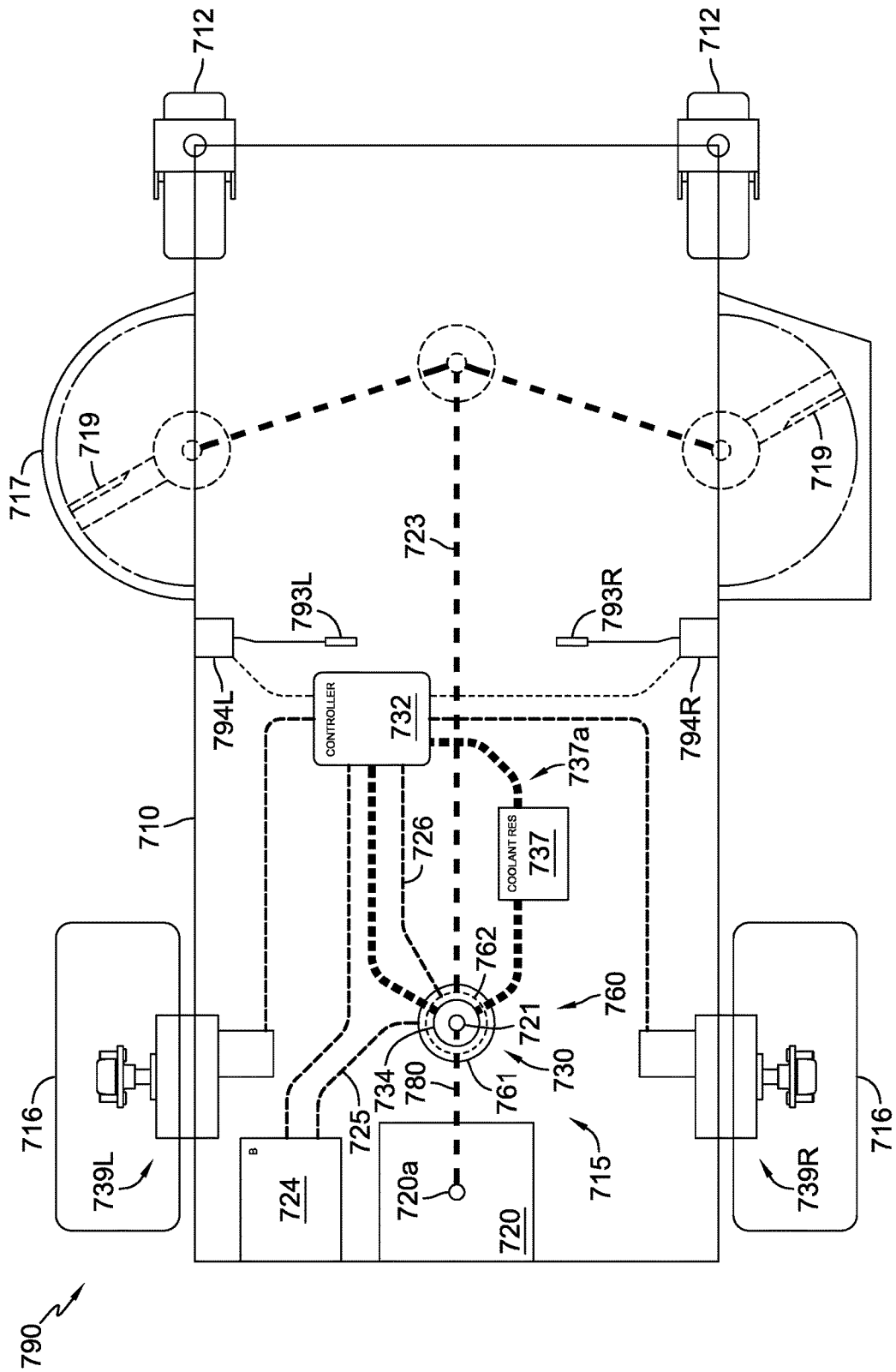
FIG. 14 is a partially schematic drawing of an exemplary vehicle in accordance with a further embodiment, wherein the vehicle comprises a combined electric generator/circulating pump assembly, and a clutch-brake assembly in a stacked arrangement.

FIG. 14 illustrates a riding vehicle 790 and a power generation and transfer assembly 715 thereof, and FIGS. 15 through 19 illustrate certain components thereof, and various alternative embodiments of certain components, as discussed in detail herein. With regard to FIG. 14, vehicle 790 includes a pair of electric wheel motors 739L, 739R including internal gear reduction and drivingly attached to a pair of driven wheels 716. A set of caster wheels 712 is disposed at the front of frame 710, which also supports a mowing deck 717 having at least one mowing blade 719 driven by a standard belt and pulley system 723 via output pulley 754 engaged to output hub 753 of clutch-brake 762. A prime mover 720, which may be an internal combustion engine, is disposed on frame 710 near the rear thereof and output shaft 720a of prime mover 720 drives the power generation and transfer assembly 715 via drive belt 780. It will be understood that output shaft 720a may be directly or indirectly driven by the prime mover 720.

Figure 13:
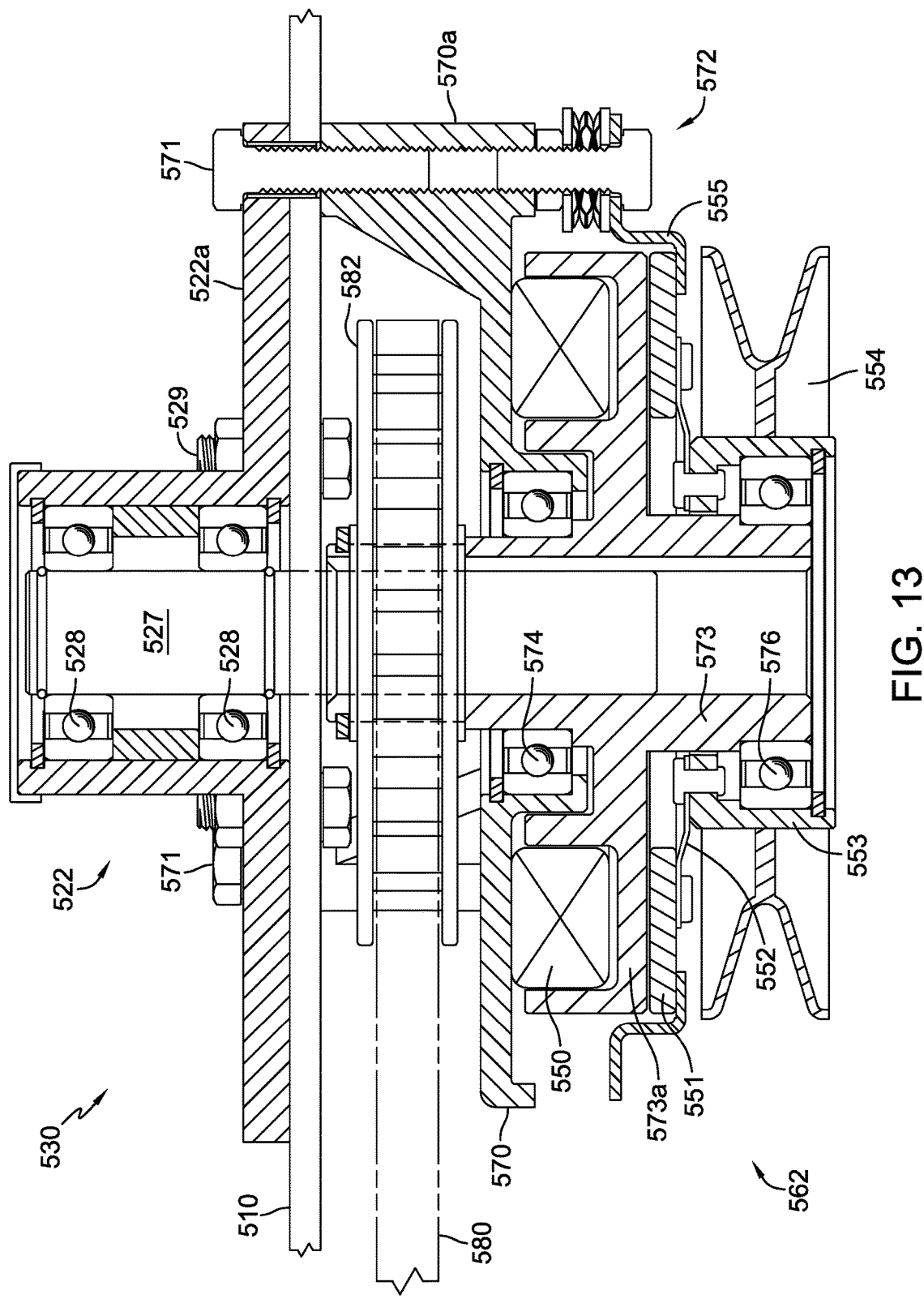
FIG. 13 is a cross sectional view of the spindle-mounted clutch assembly of FIG. 10 along the line 13-13 in FIG. 10.
Figure 15:
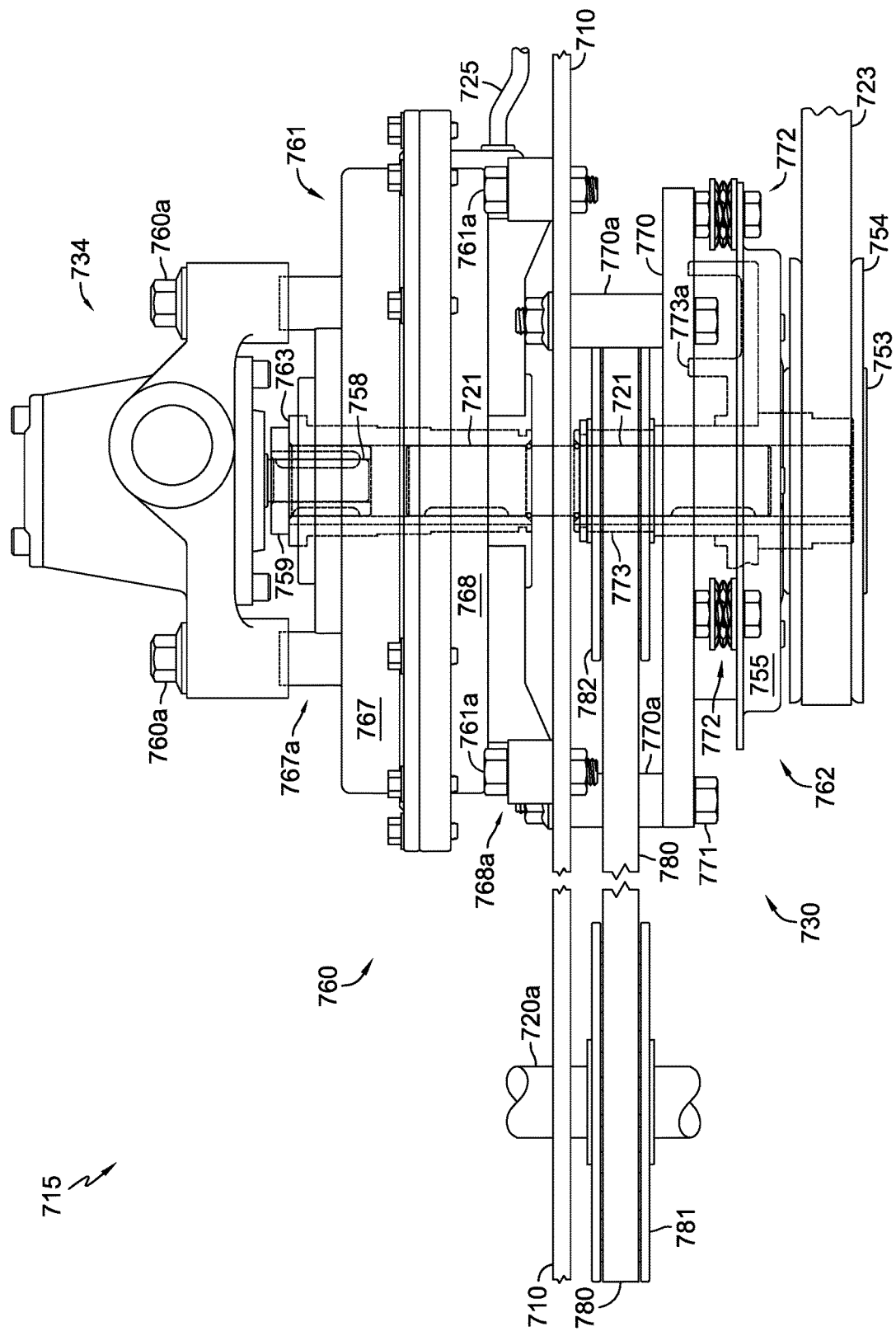
FIG. 15 is a side elevational view of an embodiment of the combined electric generator/circulating pump assembly and clutch-brake assembly of FIG. 14.

Power generation and transfer assembly 715 includes generator and circulating pump assembly 760 and clutch-brake assembly 730 configured together in a stacked arrangement. Generator and circulating pump assembly 760 includes a generator 761 and an optional circulating pump 734 preferably disposed on top of generator 761 and, as will be described below, on upper housing member 767. Clutch-brake assembly 730 includes clutch-brake 762 and input pulley 782. Generator and circulating pump assembly 760 may be disposed on an upper portion of frame 710, while clutch-brake assembly 730 may be attached on a lower or bottom side of the frame 710 to improve the ease of installation and/or removal of the separate components. Input pulley 782 is located between generator 761 and clutch-brake assembly 762 and is drivingly engaged to input tube 773 of clutch-brake assembly 762. Clutch rotor 773a is either engaged to input tube 773 as shown in FIG. 15 or formed therewith as illustrated in FIG. 13. Input tube 773 is, in turn, connected to a dual input shaft 721 that is drivingly engaged to the input tube 763 of generator 761.

Vehicle 790 includes a controller 732 that is operatively connected to a battery 724 and to electric wheel motors 739L, 739R. Generator 761 supplies power to battery 724 via conductor 725, and battery 724 supplies power to controller 732. Controller 732 receives and processes operator input from a pair of operator control levers 793L, 793R connected to a corresponding pair of potentiometers or position sensors 794L, 794R to adjust the rotational speed and direction of electric wheel motors 739L, 739R. Controller 732 is also operatively connected to clutch-brake 762 via conductor 726.

Similar to circulating pump 534 of vehicle 590, circulating pump 734 receives cooling fluid from a coolant reservoir 737 of vehicle 790. In this vehicle system, the circulating pump 734 is located above generator 761 and is used to cool the controller 732. Optionally, circulating pump 734 may be used to cool the battery 724 or another component (or multiple components) of vehicle 790. As in prior embodiments, coolant lines 737a are used to connect circulating pump 733 and the various components of vehicle 790.

Generator 761 is disposed in a housing comprising upper generator housing member 767 and lower generator housing member 768 and may be internally constructed substantially similar to generator 561 described previously herein or may be internally constructed in another known generator configuration.

As shown in FIG. 15, the lower generator housing member 768 includes a mounting structure 768a that allows generator and circulating pump assembly 760 to be mounted to the vehicle frame 710 via fasteners 761a. Upper generator housing member 767 includes pump mounting structure 767a to which circulating pump 734 is attached via fasteners 760a.

Figure 16:
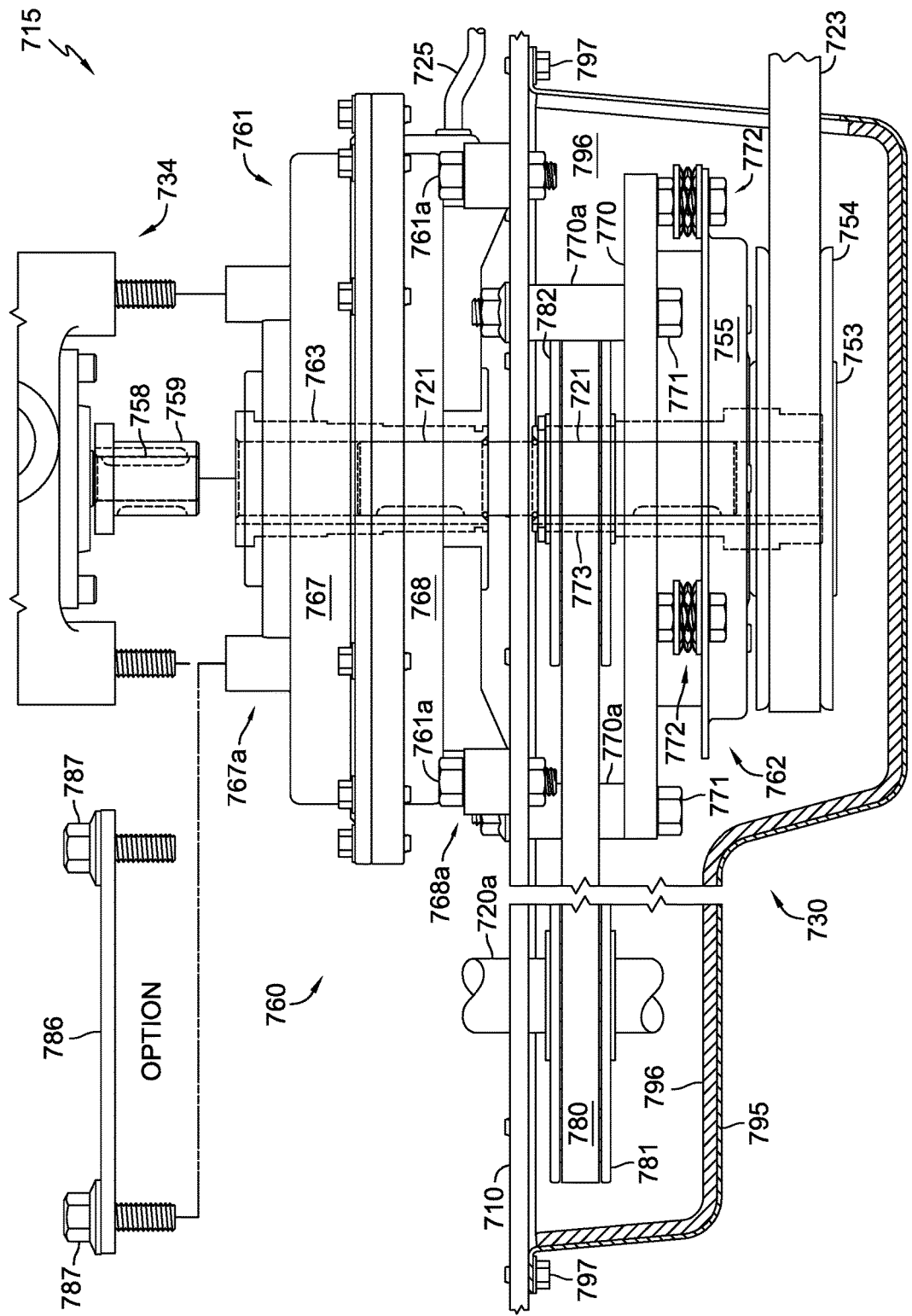
FIG. 16 is a side elevational view illustrating certain manufacturing options of the combined electric generator/circulating pump assembly and clutch-brake assembly of FIG. 15.

FIG. 16 depicts certain options that may be employed for power generation and transfer assembly 715. A vehicle or equipment manufacturer may choose to omit the circulating pump 734 and instead utilize pump mounting structure 767a to install a cover plate 786 via fasteners 787 engaged thereto. Another illustrated option is that of adding a guard 795 to enclose as much of the drive belt 780 and associated components as is desirable and practicable in order to improve safety and protect various components of power generation and transfer assembly 715 (or similar embodiments described herein). Guard 795 may be mounted to vehicle frame 710 via plurality of fasteners 797 and may be lined with sound-deadening material 796 to reduce noise.

Figure 17:
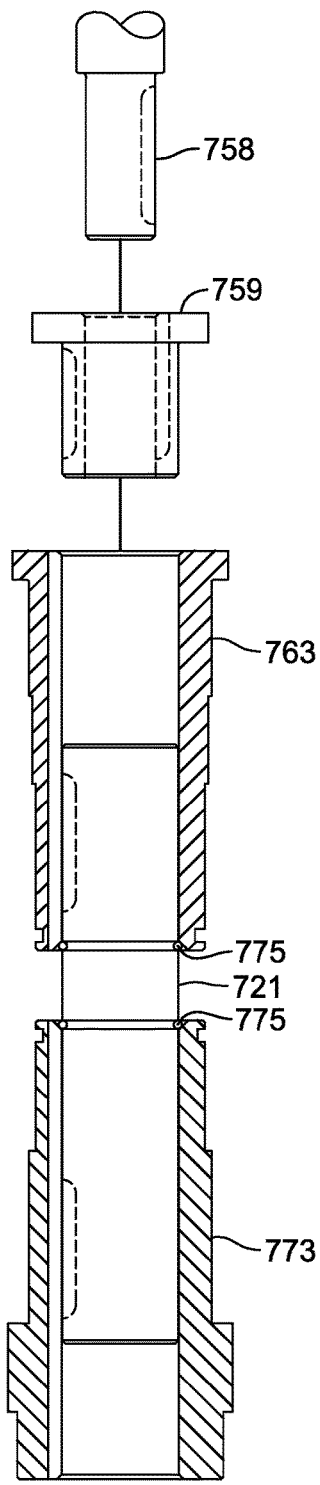
FIG. 17 is a side elevational view of the drive arrangement connecting the electric generator/circulating pump assembly and clutch-brake assembly of FIG. 15, shown partially cross-sectioned for clarity.

An exploded and partially sectioned view of dual input shaft 721 and certain associated components is shown in FIG. 17. This arrangement allows shaft 721 to be installed first in either the generator 761 or the clutch-brake 762 and also allows removal of either one of these components from vehicle frame 710 without removing the other. A pair of retaining rings 775 prevents axial movement of shaft 721 after installation. It should be noted that keyseats (or keyways) are shown, but the associated keys are well-known and omitted for clarity. Additionally, other means (such as splines, for example) of connecting the adapter couplings and shafts to the rotating input tubes 763, 773 are well-known in the art and could be employed in lieu of or in combination with keys and keyways. Adapter coupling 759 is inserted into generator input tube 763 to rotate therewith and pump input shaft 758 is inserted into adapter coupling 759 to rotate therewith when circulating pump 734 is installed. In this manner, clutch-brake 762, generator 761 and circulating pump 734 are all driven by a single input, and more specifically, by belt 780 via pulley 782.

Figure 18:
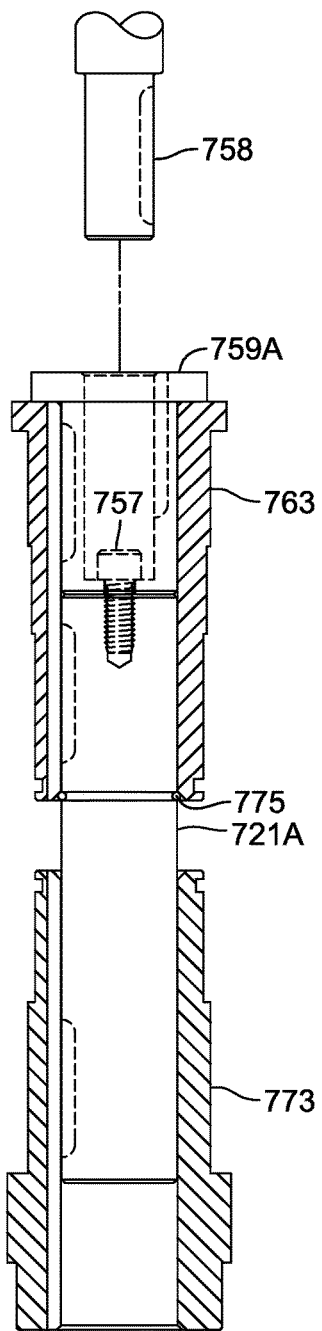
FIG. 18 is a side elevational view of an alternate embodiment of the drive arrangement connecting the electric generator/circulating pump assembly and clutch-brake assembly of FIG. 15, shown partially cross-sectioned for clarity.

A partially sectioned view of an alternative dual input shaft 721A and certain associated components is shown in FIG. 18. This arrangement allows shaft 721A to be installed and constrained in the generator 761 first. The alternate adapter coupling 759A is secured to alternative shaft 721A by fastener 757 and axial movement of shaft 721A and adapter coupling 759A is further constrained by retaining ring 775. It should be noted that adapter coupling 759A could be used in lieu of adapter coupling 759 shown in FIG. 17, without using fastener 757.

Figure 19:
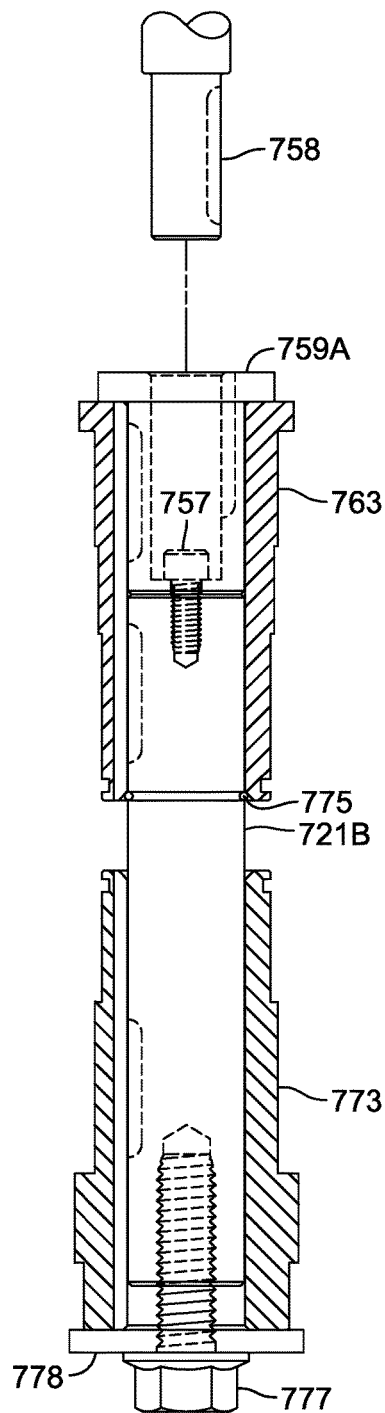
FIG. 19 is a side elevational view of another alternate embodiment of the drive arrangement connecting the electric generator/circulating pump assembly and clutch-brake assembly of FIG. 15, shown partially cross-sectioned for clarity.

In vehicle 790, input pulley 782 of clutch-brake 762 is driven by belt 780 that is driven by pulley 781 engaged to output shaft 720a of prime mover 720. Pulleys 781, 782, and drive belt 780 may be of types previously described for vehicles 290 and 590. As shown, field coil mounting plate 770 of clutch-brake 762 may be attached to vehicle frame 710 via fasteners 771 and spacers 770a. Alternatively, spacers 770a may be integrally formed with plate 770, similar to the previously described field coil mounting plate 570 having an integrally formed mounting structure 570a. In another alternative configuration, the spacers 770a may be omitted and at least one fastener 771 may be employed as an anti-rotation element in contact with plate 770 rather than being used as a joining element. In this latter configuration, the shaft embodiment shown in FIG. 19 is utilized to secure clutch-brake 762 to shaft 721B via fastener 777 and washer 778.

Figure 20:
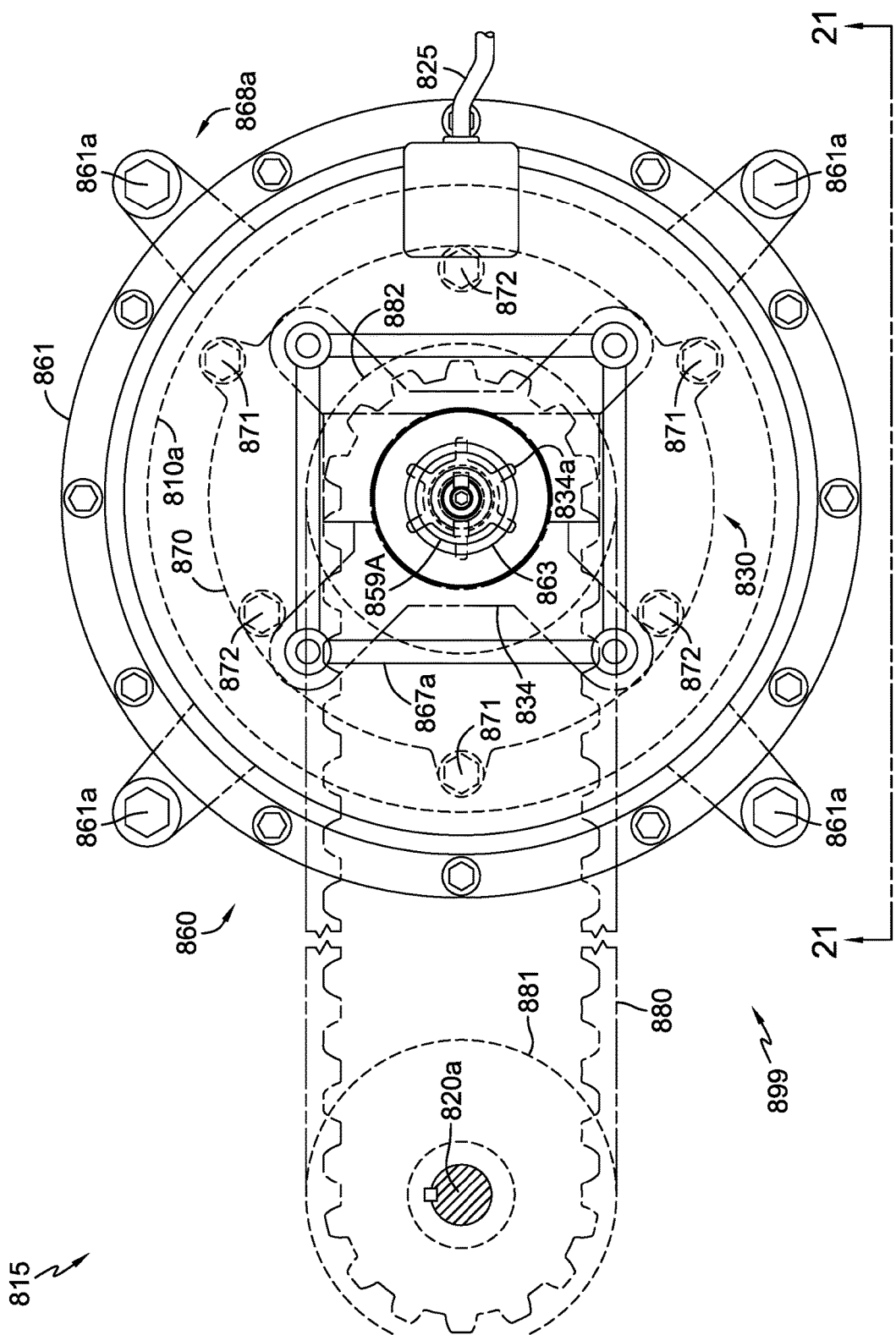
FIG. 20 is a top plan view of an alternate embodiment of a combined electric generator/circulating pump assembly and clutch-brake assembly in a stacked arrangement, with certain elements omitted, simplified or represented using phantom lines for clarity.
Figure 21:
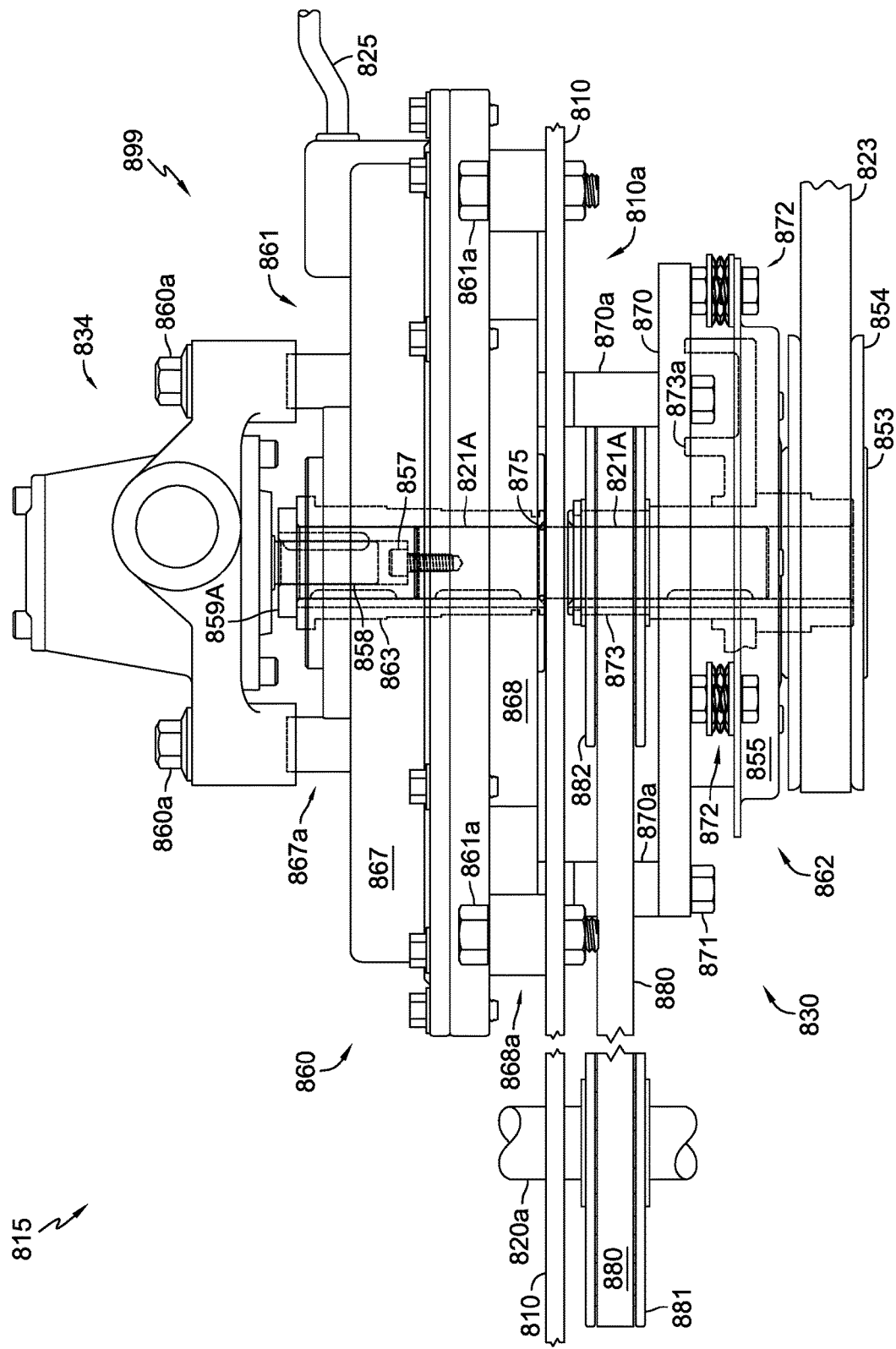
FIG. 21 is a side elevational view of the combined electric generator/circulating pump assembly and clutch-brake assembly of FIG. 20.

FIGS. 20 and 21 illustrate an alternate embodiment of a power generation and transfer assembly 815 similar in many aspects to transfer assembly 715 and suitable for use in previously described vehicle 790 shown in FIG. 14.

Power generation and transfer assembly 815 includes a pre-assembled generator unit 899 comprising generator and circulating pump assembly 860, clutch-brake assembly 830, and drive belt 880. Generator and circulating pump assembly 860 includes a generator 861 and an optional circulating pump 834; clutch-brake assembly 830 includes clutch-brake 862 and input pulley 882. Input pulley 882 is located between generator 861 and clutch-brake 862 and is drivingly engaged to input tube 873 of clutch-brake assembly 830.

Input tube 873 is drivingly engaged to shaft 821A that is drivingly engaged to the input tube 863 of generator 861. Adapter coupling 859A is inserted into generator input tube 863 to rotate therewith and pump input shaft 858 is inserted into adapter coupling 859A to rotate therewith when circulating pump 834 is installed. Adapter coupling 859A is secured to shaft 821A by fastener 857 and axial movement of shaft 821A and adapter coupling 859A is further constrained by retaining ring 875.

In power generation and transfer assembly 815, input pulley 882 of clutch-brake 862 is driven by belt 880 that is driven by pulley 881 engaged to prime mover output shaft 820a. Pulleys 881, 882, and drive belt 880 may be of types previously described herein for vehicles 290, 590 and 790.

As shown in FIG. 21, field coil mounting plate 870 of clutch-brake 862 is attached to the lower generator housing member 868 via fasteners 871 and spacers 870a. Alternatively, spacers 870a may be integrally formed with plate 870 as previously described herein. An opening 810a may be formed in vehicle frame 810 to allow installation of the pre-assembled generator unit 899. In lieu of opening 810a, brackets (not shown) or the like, with appropriate clearances for installation of the pre-assembled generator unit 599, may be used.

The lower generator housing member 868 includes a mounting structure 868a that allows generator unit 899 to be mounted to the vehicle frame 810 via fasteners 861a. The upper generator housing member 867 includes pump mounting structure 867a to which circulating pump 834 is attached via fasteners 860a.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

The invention claimed is:

1. A drive assembly for use on a vehicle having a frame comprising at least a first frame member, the drive assembly comprising:
   a rotatable input member having a first axis of rotation;
   an electric generator engaged to and driven by the rotatable input member to create an electric current, the electric generator being disposed in a generator housing having an upper housing member and a lower housing member, wherein the lower housing member is connected to a first side of the first frame member;
   a clutch assembly engaged to and driven by the rotatable input member, wherein the clutch assembly is connected to a second side of the first frame member, opposite the first side;
   a circulating pump removably connected to the upper housing member and driven by the rotatable input member, whereby the electric generator is disposed between the clutch assembly and the circulating pump.

2. The drive assembly of claim 1, wherein the rotatable input member comprises:
   a first input tube engaged to and driving the electric generator;
   a second input tube engaged to and driving the clutch assembly; and
   a dual input shaft extending between and engaging both the first input tube and the second input tube; and
   a pump input shaft coupled to the first input tube.

3. The drive assembly of claim 2, further comprising an input pulley directly engaged to the second input tube.

4. The drive assembly of claim 2, further comprising an adaptor connecting the pump input shaft to the first input tube.

5. A drive assembly comprising:
   a rotatable input member;
   an electric generator disposed in a generator housing having an upper housing and a lower housing, wherein the electric generator is driven by the rotatable input member to create an electric current;
   a clutch assembly driven by the rotatable input member and engaged to and driving a clutch output, the clutch assembly located adjacent to the lower housing of the electric generator; and
   a circulating pump connected to the upper housing of the electric generator and driven by the rotatable input member.

6. The drive assembly of claim 5, wherein the clutch assembly comprises a field coil mounting plate attached to a frame of a vehicle.

7. The drive assembly of claim 6, wherein the clutch assembly is a clutch-brake, and the clutch-brake drives an output pulley.

8. The drive assembly of claim 7, further comprising an input pulley, wherein the rotatable input member comprises:
   a first input tube engaged to and driving the electric generator;
   a second input tube engaged to and driving the clutch assembly; and
   a dual input shaft extending between and engaging both the first input tube and the second input tube; and
   a pump input shaft coupled to the first input tube, wherein the input pulley is directly engaged to the second input tube.

9. The drive assembly of claim 5, wherein the lower housing of the electric generator further comprises a mounting structure to permit the generator housing to be mounted to a frame of a vehicle.

10. A vehicle, comprising:
    the drive assembly of claim 5;
    a pair of driven wheels;
    a pair of power transfer mechanisms disposed on a vehicle frame, each power transfer mechanism being connected to and driving one of the pair of driven wheels;
    a controller electrically connected to a battery and to the electric generator, wherein the controller is electrically engaged to and separately controls the output of the pair of power transfer mechanisms in response to a user input.

11. The vehicle of claim 10, wherein the pair of power transfer mechanisms comprises a pair of electric wheel motors, and the circulating pump is connected to and provides fluid to the controller through at least one of a set of fluid lines.

12. A drive assembly for use on a vehicle having a frame member, a fluid reservoir and a plurality of electrical components, the drive assembly comprising:
    a rotatable input member;
    a generator disposed in a generator housing and driven by the rotatable input member, wherein a lower portion of the generator housing is mounted on a first side of the frame member;
    a clutch assembly driven by the rotatable input member and engaged to and driving a clutch output, the clutch assembly being mounted on a second side of the frame member, wherein the second side is below the first side with respect to a normal driving state of the vehicle; and
    a circulating pump connected to an upper portion of the generator housing and driven by the rotatable input member, wherein the circulating pump is connected to the fluid reservoir and at least one of the plurality of electrical components through a set of fluid lines.

13. The drive assembly of claim 12, wherein the generator housing comprises an upper housing member comprising the upper portion of the generator housing and a lower housing member comprising the lower portion of the generator housing, and a pump mounting structure formed on the upper housing member.

14. The drive assembly of claim 12, wherein the rotatable input member comprises:
    a first input tube engaged to and driving the generator;
    a second input tube engaged to and driving the clutch assembly; and
    a dual input shaft extending between and engaging both the first input tube and the second input tube.

15. The drive assembly of claim 14, wherein the rotatable input member further comprises a pump input shaft coupled to the first input tube.

16. The drive assembly of claim 14, wherein the clutch assembly comprises a clutch rotor engaged to and driven by the second input tube.

17. The drive assembly of claim 12, further comprising an input pulley engaged to and driven by a belt powered by a prime mover, the input pulley directly engaged to the rotatable input member.

18. The drive assembly of claim 17, wherein the input pulley is disposed between the clutch assembly and the generator.

19. The drive assembly of claim 18, wherein the input pulley is disposed adjacent the second side of the frame member.

20. The drive assembly of claim 18, wherein the generator is disposed between the circulating pump and the input pulley.

21. The drive assembly of claim 12, wherein the clutch output comprises an output pulley and the clutch assembly further comprises a brake assembly.

22. The drive assembly of claim 21, further comprising a guard mounted on the second side of the frame member and enclosing at least the output pulley.

23. The drive assembly of claim 12, wherein the circulating pump is connected to the fluid reservoir through a first fluid line and at least one of the plurality of electrical components through a second fluid line.

* * * * *